(12) United States Patent
Fasanella et al.

(10) Patent No.: US 12,296,986 B2
(45) Date of Patent: May 13, 2025

(54) DEPLOYABLE PANEL ARRAY AND RELATED ASSEMBLIES AND METHODS

(71) Applicant: Northrop Grumman Systems Corporation, Falls Church, VA (US)

(72) Inventors: Nicholas Fasanella, Elkridge, MD (US); George Firstbrook, Arvada, CO (US); R. Christopher Thiem, Westminister, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 684 days.

(21) Appl. No.: 17/571,369

(22) Filed: Jan. 7, 2022

(65) Prior Publication Data
US 2024/0300673 A1    Sep. 12, 2024

(51) Int. Cl.
*B64G 1/22* (2006.01)
*B64G 1/42* (2006.01)
*B64G 1/44* (2006.01)

(52) U.S. Cl.
CPC .......... *B64G 1/222* (2013.01); *B64G 1/2222* (2023.08); *B64G 1/42* (2013.01); *B64G 1/443* (2013.01); *B64G 1/446* (2013.01)

(58) Field of Classification Search
CPC ....... B64G 1/222; B64G 1/2222; B64G 1/42; B64G 1/44; B64G 1/443; B64G 1/446
See application file for complete search history.

(56) References Cited

U.S. PATENT DOCUMENTS

| | | | | |
|---|---|---|---|---|
| 3,525,483 A | * | 8/1970 | Van Alstyne | B64G 1/2224 244/172.6 |
| 5,319,905 A | * | 6/1994 | Szirtes | B64G 1/2228 244/172.6 |
| 5,520,747 A | * | 5/1996 | Marks | B64G 1/443 136/246 |
| 5,785,280 A | * | 7/1998 | Baghdasarian | B64G 1/222 244/172.6 |
| 5,833,176 A | * | 11/1998 | Rubin | B64G 1/443 244/172.7 |

(Continued)

FOREIGN PATENT DOCUMENTS

| | | |
|---|---|---|
| EP | 2657985 A2 | 10/2013 |
| GB | 2114812 A | 8/1983 |

OTHER PUBLICATIONS

International Search Report for International Application No. PCT/US2023/060093, mailed Apr. 5, 2023, 7 pages.

(Continued)

*Primary Examiner* — Michael H Wang
(74) *Attorney, Agent, or Firm* — TraskBritt

(57) ABSTRACT

A panel array and associated deployment system may include a first cable extending along a first row of panels and coupled to each panel of the first row of panels. The array and system may further include a second cable extending along a second row of panels and coupled to each panel of the second row of panels. The array and system may also include a first column of panels comprising a panel from the first row of panels and a panel from the second row of panels. The system may further include a spool positioned adjacent the first column of panels. The spool may be coupled to at least one of the first cable and the second cable and configured to apply tension to the first cable and/or the second cable.

20 Claims, 23 Drawing Sheets

(56) References Cited

U.S. PATENT DOCUMENTS

| | | | | |
|---|---|---|---|---|
| 5,909,860 A * | 6/1999 | Lee | B64G 1/443 | 136/246 |
| 6,008,447 A * | 12/1999 | Meurer | B64G 1/443 | 244/172.6 |
| 6,010,096 A | 1/2000 | Baghdasarian | | |
| 6,031,178 A * | 2/2000 | Kester | B64G 1/2224 | 16/75 |
| 6,284,967 B1 * | 9/2001 | Hakan | B64G 1/443 | 136/292 |
| 6,478,261 B2 | 11/2002 | Laraway et al. | | |
| 6,547,190 B1 * | 4/2003 | Thompson | B64G 1/443 | 244/172.7 |
| 6,637,702 B1 * | 10/2003 | McCandless | B64G 1/443 | 244/172.6 |
| 7,093,804 B2 * | 8/2006 | Desaguiler | H02S 30/20 | 244/158.3 |
| 7,806,370 B2 | 10/2010 | Beidleman et al. | | |
| 8,387,921 B2 | 3/2013 | Taylor et al. | | |
| 8,496,209 B2 * | 7/2013 | Chaix | B64G 1/2229 | 244/172.6 |
| 9,120,583 B1 * | 9/2015 | Spence | B64G 1/2229 | |
| 9,512,618 B2 * | 12/2016 | Lang | F24S 20/50 | |
| 10,435,182 B1 * | 10/2019 | Baghdasarian | B64G 1/44 | |
| 11,014,693 B2 * | 5/2021 | Francis | E04C 3/28 | |
| 2002/0074458 A1 * | 6/2002 | Laraway | B64G 1/222 | 244/172.6 |
| 2005/0178921 A1 * | 8/2005 | Stribling | B64G 1/222 | 244/172.7 |
| 2009/0184207 A1 * | 7/2009 | Warren | B64G 1/2222 | 244/172.6 |
| 2011/0147532 A1 * | 6/2011 | Chaix | B64G 1/222 | 244/172.6 |
| 2012/0090660 A1 * | 4/2012 | Keller | E04C 3/005 | 52/645 |
| 2012/0227916 A1 * | 9/2012 | Kellberg | B64G 1/222 | 160/405 |
| 2015/0107583 A1 * | 4/2015 | Doyle | F24S 30/425 | 126/714 |
| 2016/0332752 A1 * | 11/2016 | Abrams | B64G 1/2229 | |
| 2017/0063296 A1 * | 3/2017 | Cruijssen | H10F 77/488 | |
| 2019/0092496 A1 * | 3/2019 | Santos Soto | B64G 1/2229 | |
| 2020/0411998 A1 | 12/2020 | Mast et al. | | |
| 2021/0175601 A1 * | 6/2021 | Gannon | H01Q 1/1207 | |
| 2023/0046563 A1 * | 2/2023 | Baghdasarian | H02S 20/32 | |

OTHER PUBLICATIONS

International Written Opinion for International Application No. PCT/US2023/060093, mailed Apr. 5, 2023, 12 pages.

* cited by examiner

DEPLOYABLE PANEL ARRAY AND RELATED ASSEMBLIES AND METHODS

STATEMENT REGARDING FEDERALLY SPONSORED RESEARCH OR DEVELOPMENT

This invention was made with government support under Contract Number HQ0727-16-D-0004 awarded by the United States Air Force Research Laboratory under the authority of the United States Defense Microelectronics Activity Division. The government has certain rights in the invention.

TECHNICAL FIELD

Embodiments of the present disclosure generally relate to panel arrays. In particular, embodiments of the present disclosure relate to deployable panel arrays, panel array assemblies, and related methods of assembly and deployment of panel arrays.

BACKGROUND

Equipment deployed in space, such as satellites, manned spacecraft, pods, etc., may utilize panel arrays for power generation, receiving and/or transmitting antennas, etc. For example, power generated by solar arrays may be used to power computers, control systems, communication systems, etc. Radiofrequency or RF panel arrays may be used to transmit and/or receive radiofrequency signals to and/or from earth based equipment.

BRIEF SUMMARY

Embodiments of the present disclosure may include a panel array. The panel array may include a plurality of panels arranged in one or more columns and one or more rows. The panel array may further include a first cable extending along a first row of the one or more rows. The at least one cable may be coupled to each of the plurality of panels in the first row. The panel array may also include interlocking features on adjacent panels of the plurality of panels in the first row. The first cable may be configured to apply tension between the plurality of panels in the first row and cause the interlocking features to engage.

Another embodiment of the present disclosure may include a panel array deployment system. The system may include a first cable extending along a first row of panels and coupled to each panel of the first row of panels. The system may further include a second cable extending along a second row of panels and coupled to each panel of the second row of panels. The system may also include a first column of panels comprising a panel from the first row of panels and a panel from the second row of panels. The system may further include a spool positioned adjacent the first column of panels. The spool may be coupled to the first cable and the second cable, and may be configured to apply tension to the first cable and the second cable.

Other embodiments of the present disclosure may include a method of deploying a panel array. The method may include providing a panel array comprising multiple panels coupled to one another through hinged connections. The hinged connections may be configured to create multiple rows and columns of panels in an expanded configuration. The method may further include applying tension to a first cable and a second cable through a spool. The method may also include extending a row of panel sets, each panel set comprising a plurality of the multiple panels. The method may further include extending the panel sets to form a column of the multiple panels from each extended panel set. The method may also include engaging first interlocking features between adjacent panels of a first row of panels in the row of panel sets through the tension in the first cable. The method may further include engaging second interlocking features between adjacent panels of a second row of panels in the row of panel sets through the tension in the second cable.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
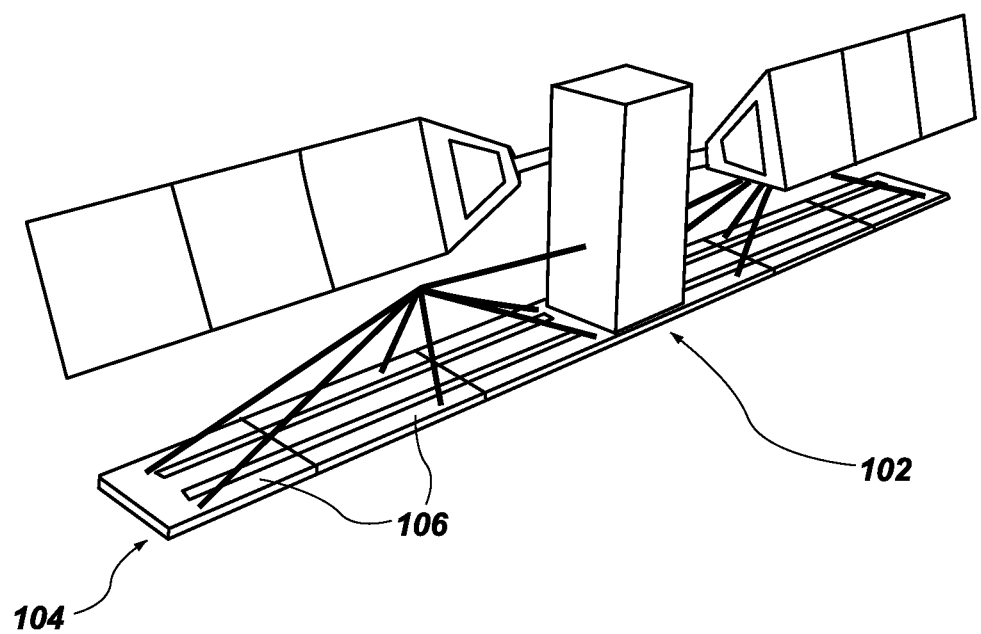
FIG. 1 illustrates a perspective view of an article including a panel array in accordance with one or more embodiments of the present disclosure.

The illustrations presented herein are not meant to be actual views of any particular panel array or component thereof, but are merely idealized representations employed to describe illustrative embodiments. The drawings are not necessarily to scale. The arrays described herein are not limited to the numbers of panels, columns, rows, etc., presented in the illustrations.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met. In another example, a substantially straight line may be a line wherein an angle between individual segments of the line vary from 180° by less than about 10°, such as less than about 5° or even less than about 1°.

As used herein, relational terms, such as "first," "second," "top," "bottom," "front," "back," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

Panel arrays (e.g., a solar panel array, an RF panel array) may be formed from multiple panels that are coupled together to form an array of panels having a large surface area. Increasing the surface area of the panel array may increase the effectiveness of the panel array. For example, power produced by a solar panel array may be proportional to the surface area of the solar panel array. Increasing the surface area of an RF panel array may improve the ability of the RF panel to receive RF signals and may increase the strength of transmitted RF signals. In some embodiments, a panel array may be two sided. For example, a first side (e.g., front side) may be a solar panel array and a second side opposite the first side (e.g., rear side) may be an RF panel array.

The panel array may be deployed on equipment for use in space. The equipment may be transported to space on a vehicle configured to travel from the surface of the earth to space, such as a rocket or other spacecraft. The vehicle may have significant limitations on available space and weight. The size and weight restrictions may limit the size of the equipment or accessories that may be included with the equipment. Thus, reducing the space required by the panel arrays in a stowed position may enable additional accessories to be included on the equipment. The size of the equipment may also be able to increase if the space required by the panel arrays in the stowed position is decreased. In other cases, reducing the size and/or weight required for the panel arrays in the stowed position may enable additional equipment to be transported in the same vehicle.

FIG. 1 illustrates an article deployed in space. The article may be a satellite, as illustrated in FIG. 1, or any other type of equipment designed to be deployed in space, such as a transportation vehicle, a research station, research equipment, etc. The article may include a body 102 and one or more panel arrays 104 extending from the body 102. The panel arrays 104 may be formed from one or more panels 106. As illustrated in FIG. 1, the panel arrays 104 may be single dimensional panel arrays 104 (i.e., one row of panels 106). The surface area of the panel arrays 104 may be increased by arranging the panels 106 into two dimensional panel arrays 104 (i.e., multiple rows of panels 106), such that the total area of the panel array 104 may be the area represented by one row of panels 106 multiplied by the number of rows. Two dimensional panel arrays 104, may enable the total area of the panel array 104 to increase, such as to areas of greater than about 1000 square meters.

Figure 2:
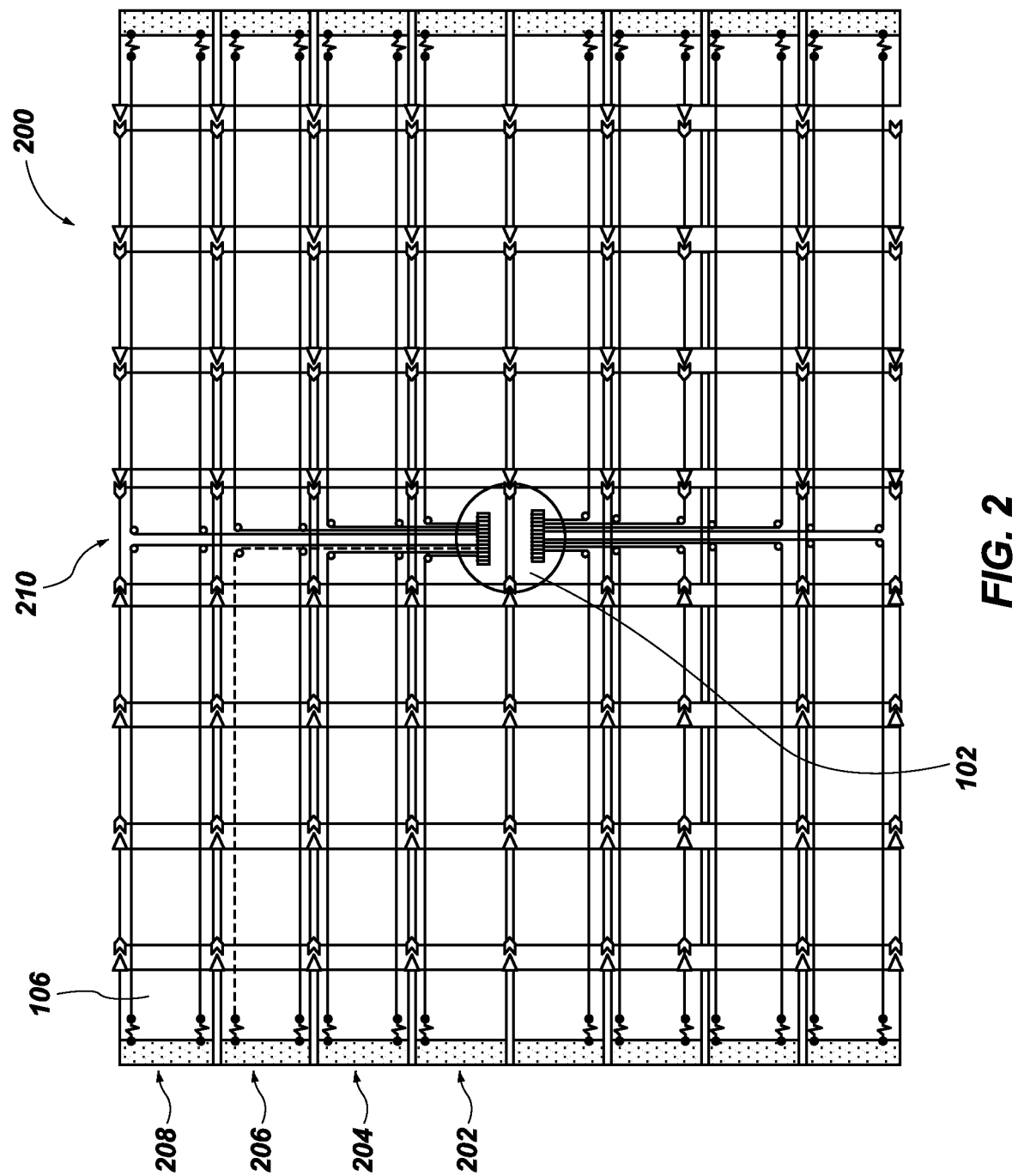
FIG. 2 illustrates a schematic view of a two dimensional panel array in accordance with one or more embodiments of the present disclosure.

FIG. 2 illustrates a two dimensional panel array 200. As illustrated in FIG. 2, the body 102 may be positioned at or near a central portion of the two dimensional panel array 200. The body 102 may be coupled to a primary column 210 of panels 106. The primary column 210 may be connected to multiple rows 202, 204, 206, 208 of panels 106 to form a two dimensional panel array 200. In some embodiments, the two dimensional panel array 200 may be two-sided. For example, the two dimensional panel array 200, may include solar panels on a first side of the two dimensional panel array and RF panes on a second side of the two dimensional panel array. In some embodiments, the two sides of the two dimensional panel array 200 may be the same type of panel, such as solar panels or RF panels.

The larger size of the two dimensional panel array 200 may introduce additional difficulties, such as for transportation. For example, a single dimensional panel array 104 may be stored in an area the size of a single panel 106 and deploy through a simple accordion style deployment. A simple accordion deployment of a two dimensional panel array 200 may result in the two dimensional panel array 200 requiring the area of an entire row of panels 106 when in the stored position. Transportation space restrictions may limit the space allowed for the two dimensional panel array 200. Accordingly, different deployment arrangements may be used to transport and deploy the two dimensional panel array 200.

The two dimensional panel array 200 may be deployed through a double accordion method described in further detail below. The double accordion deployment may result in each row 202, 204, 206, and 208 having an accordion arrangement with the panels 106 associated with each of the rows 202, 204, 206, 208 on the primary column 210. The primary column 210 may then have a simple accordion arrangement with the body 102.

Figure 3:
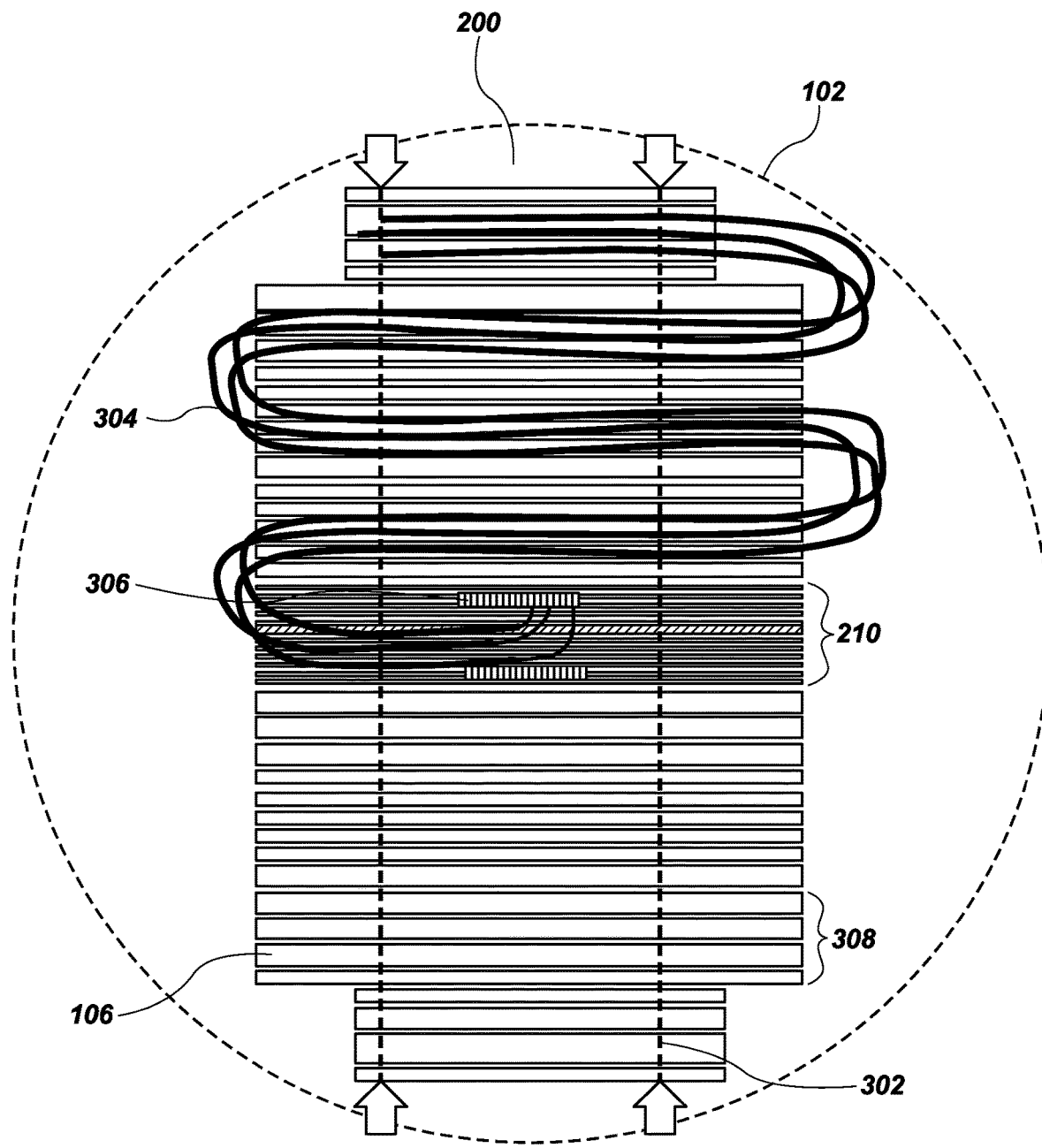
FIG. 3 illustrates a schematic view of a two dimensional panel array in a stored configuration in accordance with one or more embodiments of the present disclosure.

FIG. 3 illustrates the two dimensional panel array 200 in a stored position within the body 102. The panels 106 may be stored in a stacked arrangement having major faces (e.g., front or rear panel faces) facing each other, such that the edge faces are facing outward. The panels 106 may be arranged in segments 308 (e.g., panel sets, groups of panels, etc.), where each segment 308 corresponds with a column of the two dimensional panel array 200. The two dimensional panel array 200 may be secured in the stored position by one or more securing structures 302, such as straps, latches, casing, etc., configured to substantially prevent the two dimensional panel array 200 from extending radially.

The two dimensional panel array 200 may include one or more tension cables 304 extending from a spool 306, located in a central portion of the body 102, through each of the segments 308. The tension cables 304 may be configured to aid in deploying the two dimensional panel array 200 and securing the two dimensional panel array 200 in the deployed position. The deployment sequence is described in further detail below with respect to FIGS. 4A-4E.

The segment 308 located nearest the center of the body 102 may correspond to the primary column 210 of the two dimensional panel array 200. The primary column 210 may be configured to provide a tension anchor for the tension cables 304, as described in further detail below.

FIGS. 4A through 4E illustrate a deployment sequence for the two dimensional panel array 200. As described above, the panels 106 may be stacked such that major faces 402 of the panels 106 are facing each other and the edge faces 404 of the panels 106 are facing outward. Stacking the panels 106 in this manner may enable the two dimensional panel array 200 to be stored in an area having an area about the size of the surface area of one panel 106 and a depth of about the combined thickness of all of the panels 106 in the two dimensional panel array 200, which is less than the area occupied by the two dimensional panel array 200 when deployed.

Figure 4A:
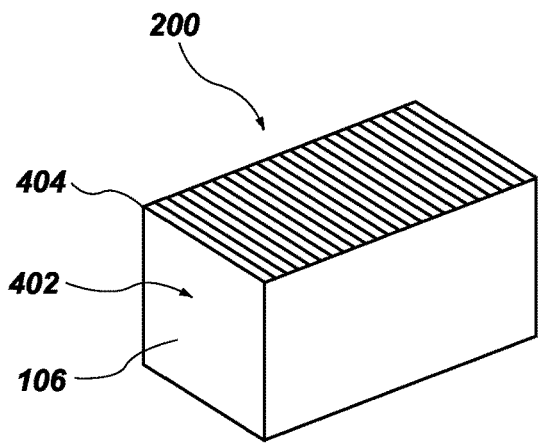
FIGS. 4A through 4E illustrate a deployment sequence for a two dimensional panel array in accordance with one or more embodiments of the present disclosure.
Figure 4B:
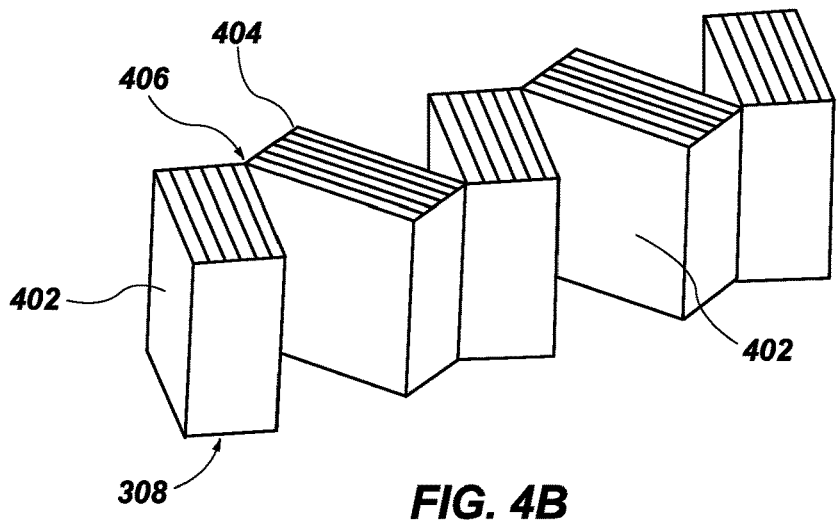
Figure 4C:
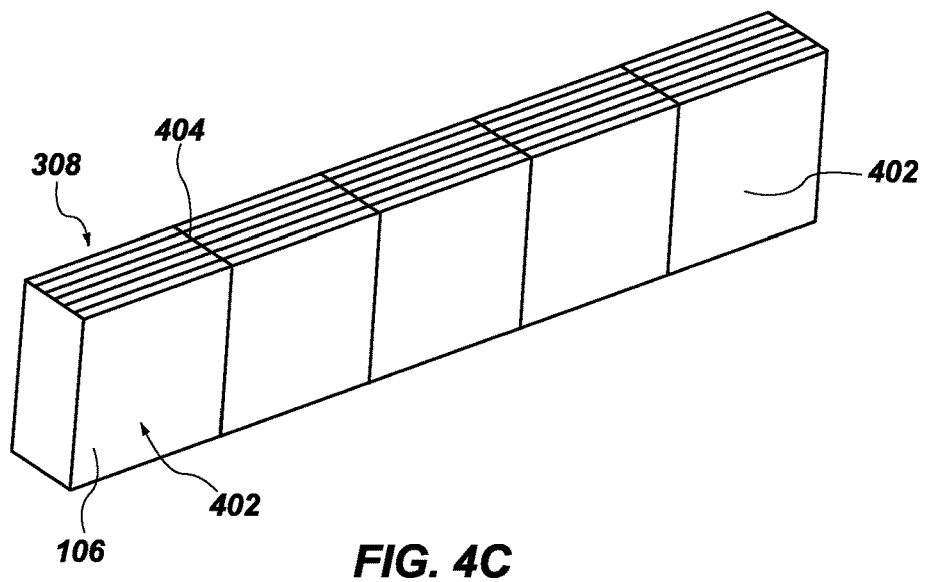
Figure 4D:
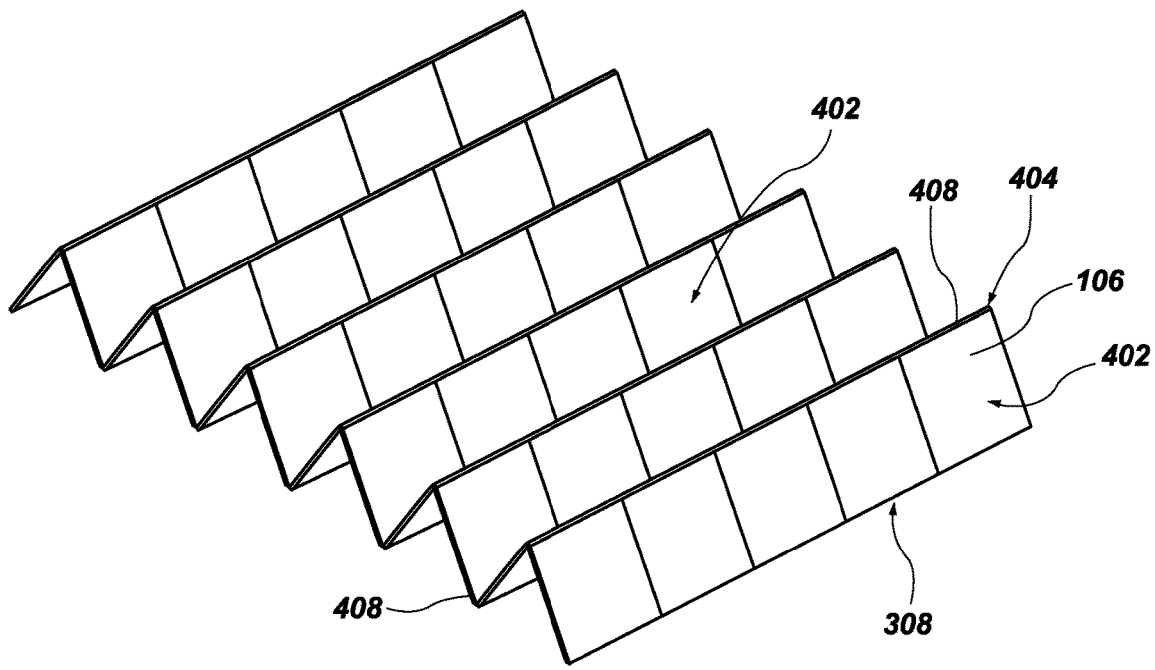

The segments 308 of the two dimensional panel array 200 may extend away from the center in an accordion style deployment. The segments 308 may be joined together through a hinged connection 406 between adjacent panels 106. The hinged connection 406 may extend along one of the edge faces 404. Once the segments 308 are fully extended, the two dimensional panel array 200 may form a row of segments 308, as illustrated in FIG. 4C. The segments 308 may each abut the adjacent segments 308 along the edge faces 404 of the segments 308 with the major faces 402 of the top and bottom panels 106 of each segment 308 facing outward.

Figure 4E:
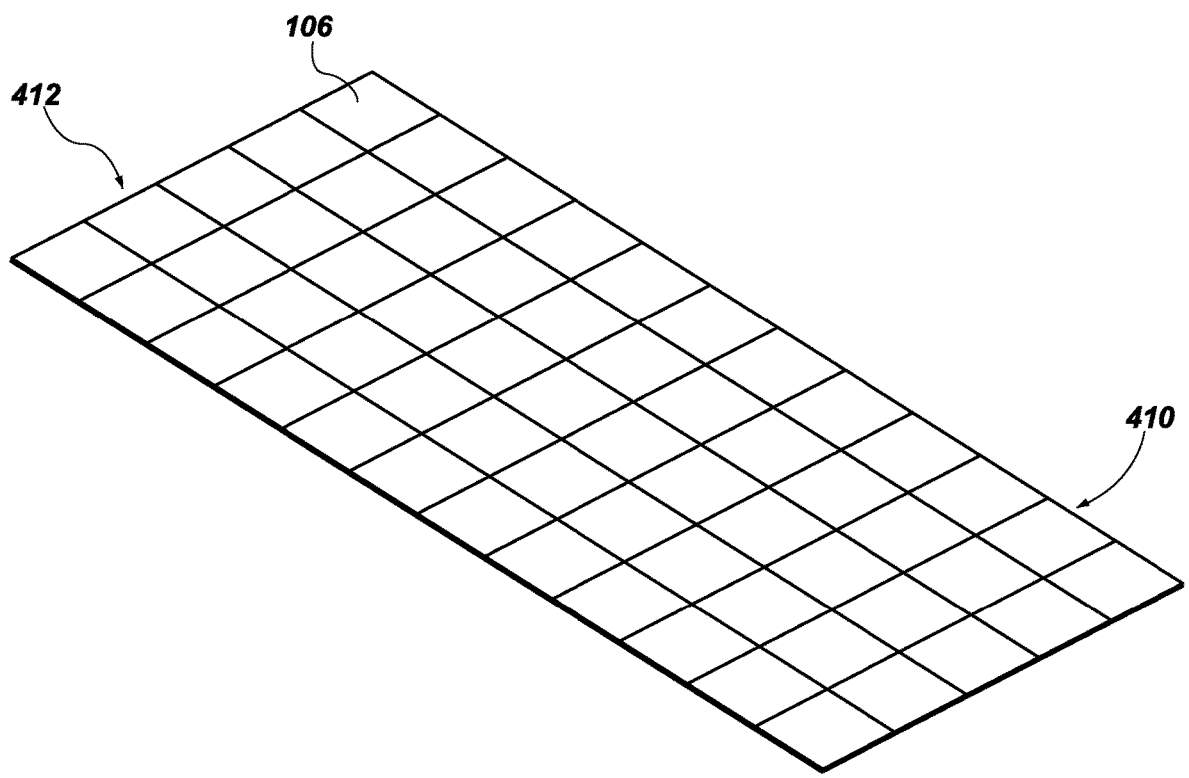

After the segments 308 are fully extended, the two dimensional panel array 200 may be extended in a second direction. The panels 106 in each segment 308 may extend in a second accordion style deployment. Each row of panels 106 may be joined to an adjacent row of panels 106 through hinged connections 408 between adjacent panels 106 along the abutting edge faces 404. The two dimensional panel array 200 may extend until the panels 106 form a substantially planar array of panels 106 as illustrated in FIG. 4E including multiple rows 410 and columns 412 of panels 106.

Figure 5:
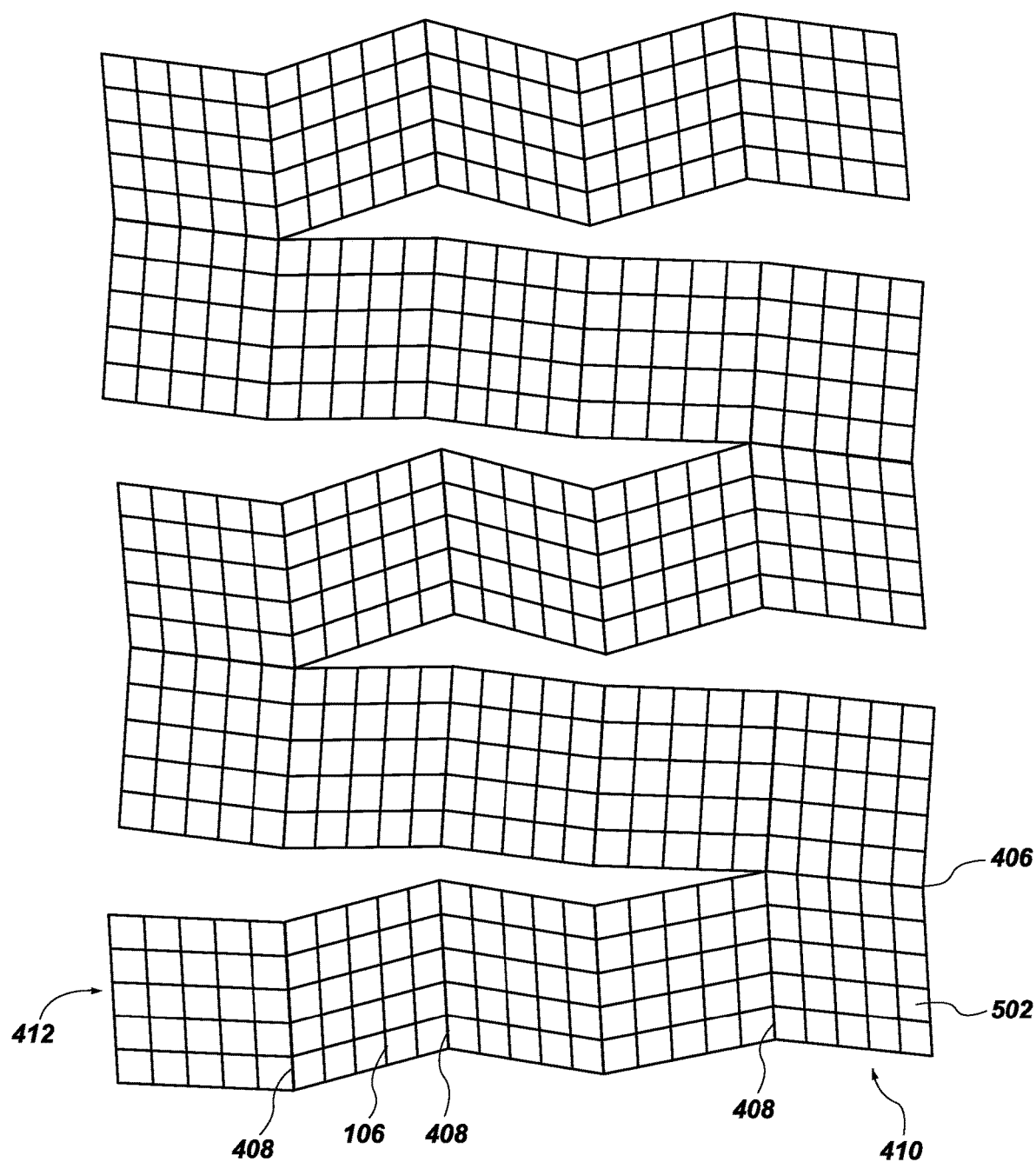
FIG. 5 illustrates a planar view of a two dimensional panel array without tension elements or supports in accordance with one or more embodiments of the present disclosure.

FIG. 5 illustrates the two dimensional panel array 200 in a manner that illustrates the hinged connections 406, 408 between each of the panels 106 in the two dimensional panel array 200. The two dimensional panel array 200 may be formed in a manner that enables each of the panels 106 in the two dimensional panel array 200 to be operably coupled to one another through adjacent panels 106. The panels 106 may be arranged in a "Z" pattern, such that each panel is coupled to adjacent panels through two hinged connections 406, 408. The two end panels 106 may be coupled to the assembly through a single hinged connection 406. The panels 106 in each column 412 may be coupled to adjacent panels in the same column 412 through the hinged connections 408. The hinged connections 406, 408 may enable the two dimensional panel array 200 to be fully assembled and stowed before the associated article is deployed to space. The fully assembled two dimensional panel array 200 may then be deployed in space without any further assembly.

Corner panels 502 may be configured to form a connection between adjacent columns 412 through the hinged connections 406. As illustrated in FIG. 5, the "Z" pattern may be formed by alternating which corner panels 502 are coupled between the columns 412, such that the corner panels 502 coupling the first and second columns 412 together are on an opposite side of the two dimensional panel array 200 from the corner panels 502 coupling, for instance, the second and third columns 412 together. This alternating pattern may enable each panel 106 to be coupled to no more than two adjacent panels 106 through a direct hinged connection 406, 408.

As described in further detail below, the tension cables 304 may close the gaps formed between the columns 412, such that the panels 106 may be arranged in a substantially planar two dimensional panel array 200. Thus, while the connection path may follow the "Z" pattern as illustrated and described above, the two dimensional panel array 200 may be deployed as a substantially uniform planar array of panels 106.

FIGS. 6A through 6F illustrate a deployment sequence of embodiments of a deployment system for the two dimensional panel array 200 configured to deploy using the tension cables 304. As described above, the two dimensional panel array 200 may be stored in a stacked configuration with major faces 402 of adjacent panels 106 facing each other and the edge faces 404 facing outward. The stack may be separated into segments 308, which may correspond with columns of the resulting two dimensional panel array 200. The segments 308 may be joined together at hinged connections 406, which may alternate side to side on the stack.

Tension cables 304 may pass between adjacent segments 308 on the side of the segments 308 including the hinged connections 406. The tension cables 304 may pass from a bottom panel 602 of a first segment 308 to a top panel 608 of a second segment 308 and from a top panel 606 of the first segment 308 to a bottom panel 604 of the second segment 308 following a similar pattern for the intermediate panels 106 as well. This pattern of the tension cables 304 may enable the tension cables 304 to each have substantially the same length of loose cable to be drawn in when deploying the two dimensional panel array 200. As described above, the tension cables 304 may be coupled to one or more spools 306 (FIG. 6F). Patterning the tension cables 304 to have substantially the same length of loose cable may enable a single spool 306 to be used to draw in multiple tension cables 304 as substantially the same amount of cable will be drawn in for each of the tension cables 304 to fully deploy the two dimensional panel array 200.

Figure 6A:
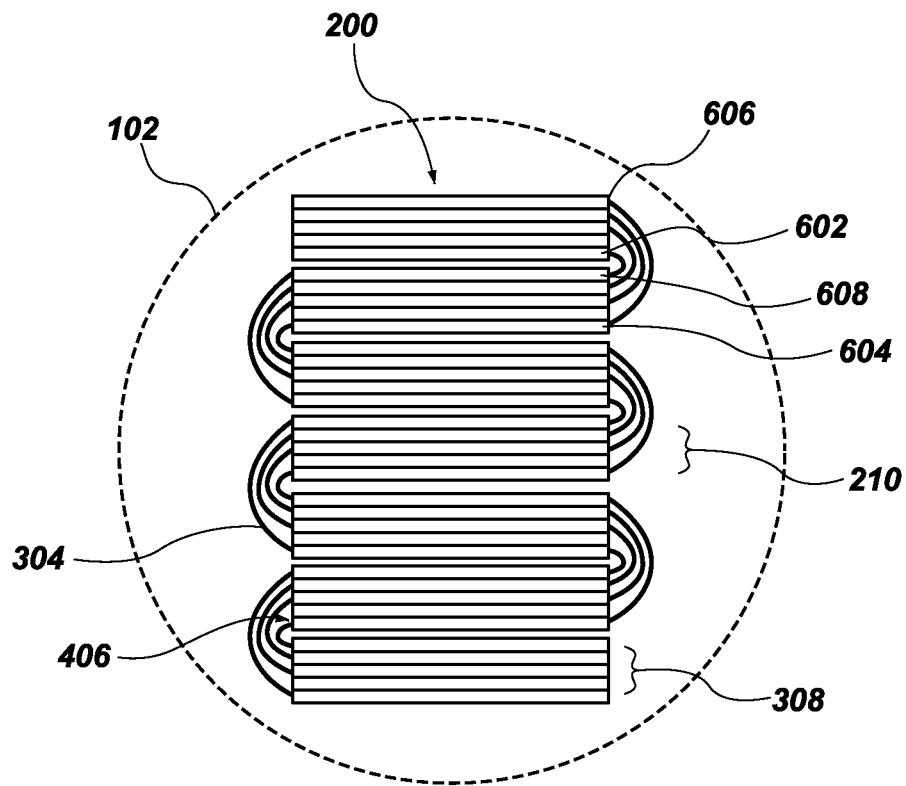
FIGS. 6A through 6F illustrate a deployment sequence of a two dimensional panel array in accordance with one or more embodiments of the present disclosure.
Figure 6B:
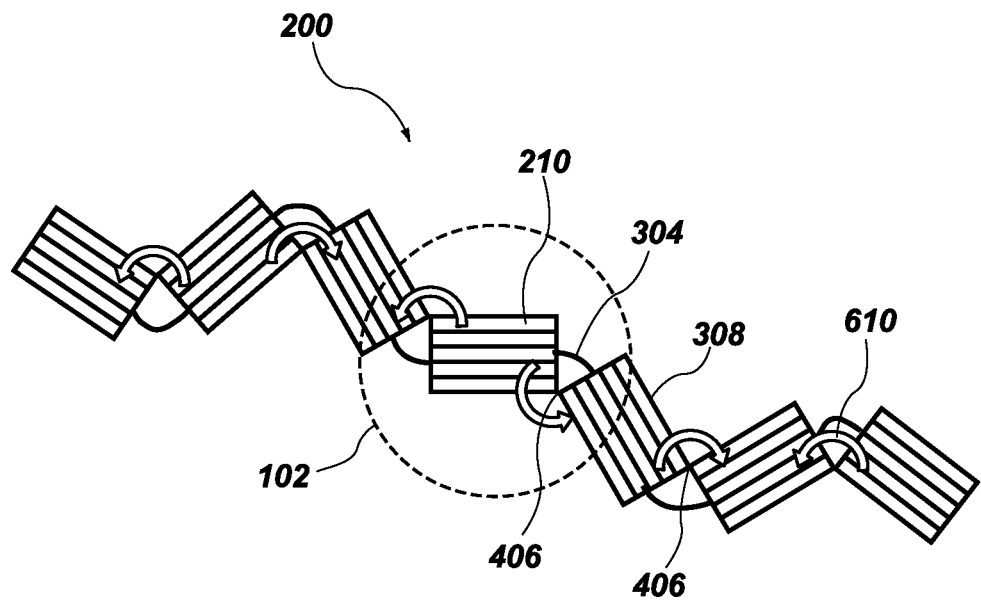
Figure 6C:
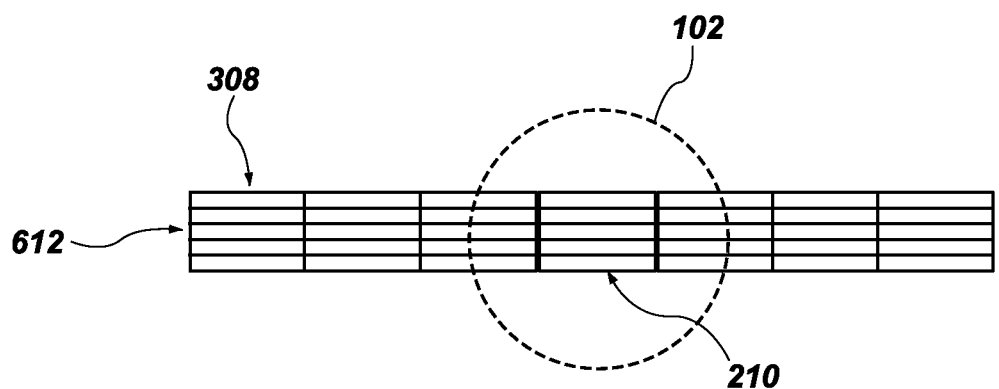

FIG. 6B illustrates the initial deployment of the segments 308. The one or more spools 306 (FIG. 6F) may begin to wind in the tension cables 304. As the tension cables 304 are wound in by the one or more spools 306, the tension created in the tension cables 304 may cause the segments 308 to rotate about the respective hinged connections 406 in the directions indicated by the arrows 610. The tension cables 304 may continue to be wound in until the segments 308 form a row of segments 612 as illustrated in FIG. 6C. In some embodiments, additional features may be included to aid in extending the rows, such as motorized hinges and booms. Embodiments including one or more of these features are described in further detail below. The row of segments 612 may include the segment 308 associated with the primary column 210 positioned in the center, proximate the body 102. The segments 308 may include a strap or latching mechanism configured to inhibit the extension in the columnar direction while the row of segments 612 is extended.

Figure 6D:
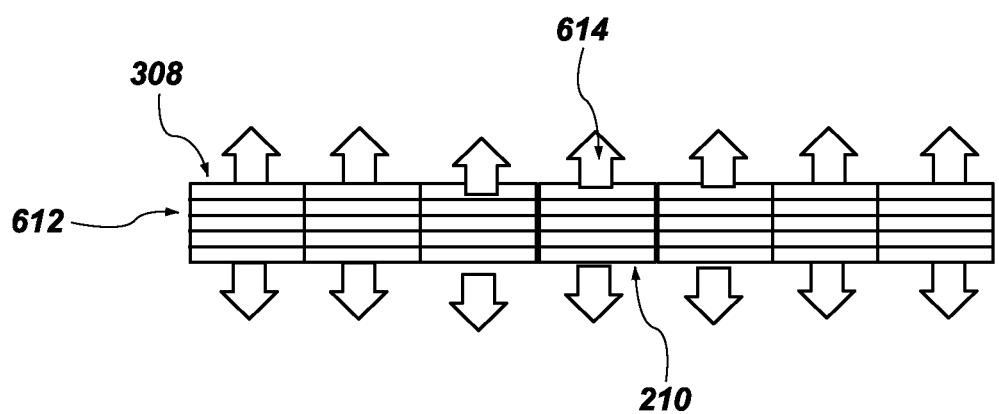
Figure 6E:
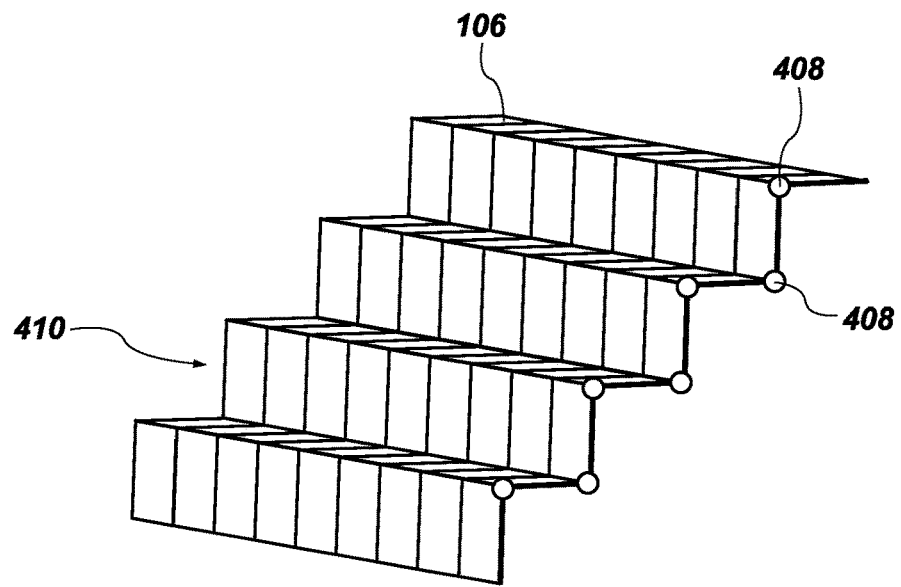
Figure 6F:
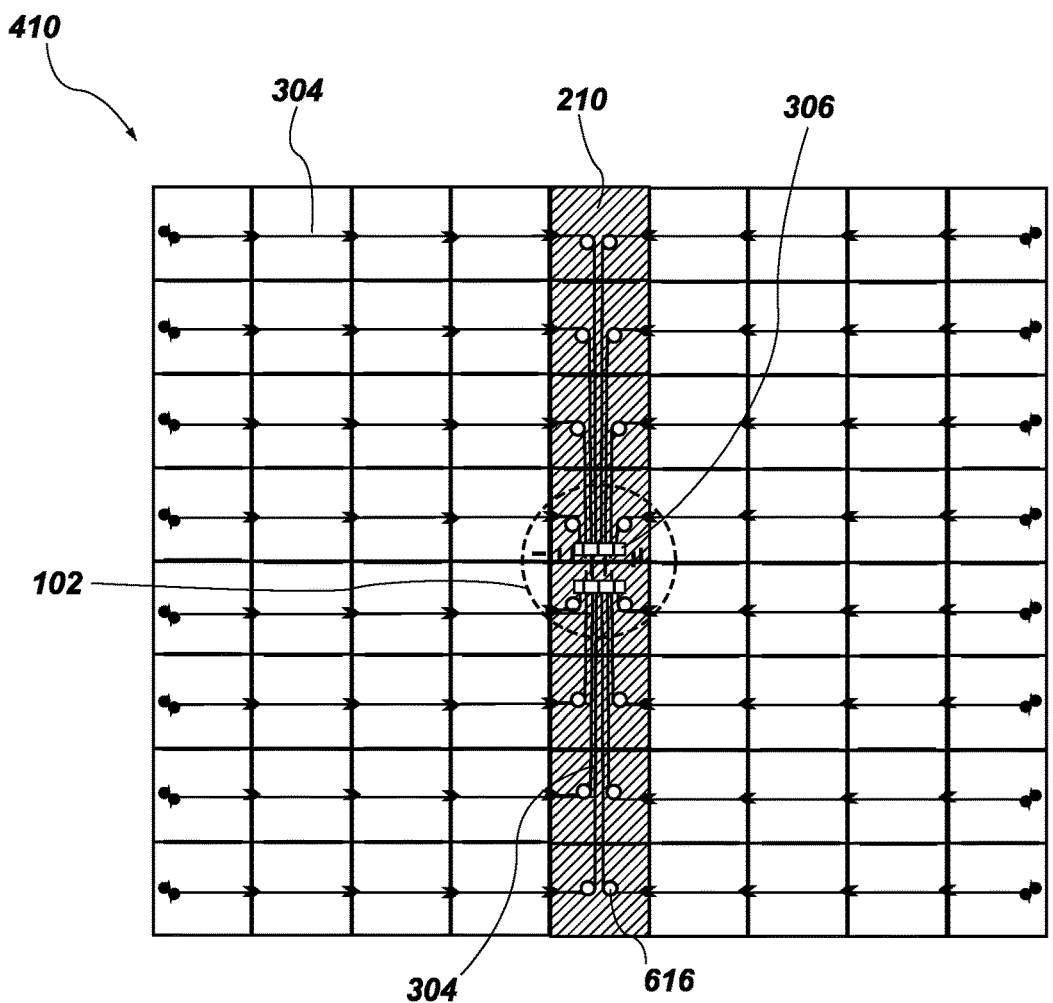

As the spools 306 continue to wind the tension cables 304 may generate an outward force illustrated by arrows 614 in FIG. 6D. When the strap or latching mechanism is released the outward force may cause the two dimensional panel array 200 to expand in a columnar direction as indicated by the arrows 614. As the two dimensional panel array 200 expands, the rows 410 may rotate relative to one another about the hinged connections 408 between the panels 106 of the respective rows 410. In some embodiments, additional features may be included to aid in extending the columns, such as motorized hinges, booms, additional cables. Embodiments including one or more of these features are described in further detail below.

As illustrated in FIG. 6F, the tension cables 304 may extend along the primary column 210 to the respective rows 410 of panels 106 where the tension cables 304 may extend around a pulley 616 into the respective rows 410. Thus, as the tension is increased in the tension cables 304, the primary column 210 may be driven outward in the direction indicated by the arrows 614. Driving the primary column 210 outward may result in the rows 410 being driven out as a result of the tension in the tension cables 304 substantially locking the rows 410 to the respective panels 106 in the primary column 210.

As illustrated in FIG. 6F, the number of tension cables 304 in the primary column 210 may be reduced at each row 410 as the tension cables 304 extend farther away from the body 102. For example, all of the tension cables 304 may be present in primary column 210 at the first row 410 nearest the body 102. In the second row 410 the tension cables 304 associated with the first row 410 nearest the body 102 may not be present such that the number of tension cables 304 present in the primary column 210 at the second row 410 may be reduced by at least two from the first row 410. The number of tension cables 304 in the primary column 210 may continue to be reduced by at least two cables at each row 410 until the ultimate row 410 positioned the greatest distance from the body 102, where the final tension cables 304 may be positioned to extend around the respective pulleys 616 and down the ultimate row 410.

As described above, the tension in the tension cables 304 along the rows 410 may be created when the segments 308 are extended out to form the row of segments 612. After the tension in the rows 410 is created the additional tension introduced into the tension cables 304 may act on the pulleys 616 to cause the primary column 210 to extend out until all of the slack in the tension cables 304 is drawn in by winding the tension cables 304 onto the spools 306.

Figure 7:
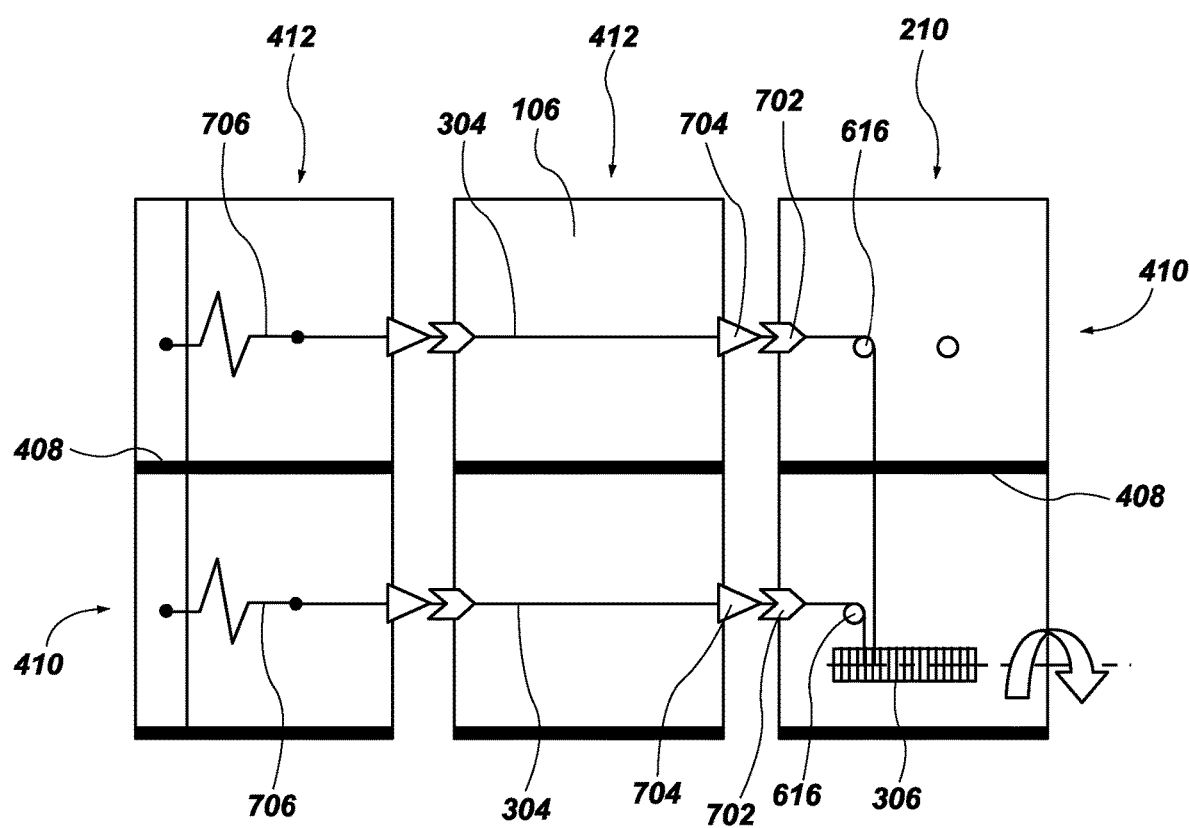
FIG. 7 illustrates an expanded schematic view of the interface between several panels of the two dimensional panel array of FIGS. 2 through 6F.

FIG. 7 illustrates an enlarged schematic view of the row and column interfaces between the panels 106. As described above, the tension cables 304 may pass up through the primary column 210 from the spool 306 before transitioning to the respective rows 410 over a pulley 616. The panels 106 in each row 410 may be coupled to the panels 106 in the adjacent row 410 through the hinged connections 408. However, as described above in FIG. 5, the adjacent columns 412 may not be coupled through hinged connections along the length of the column 412, but rather on one end or the other to form the "Z" configuration. Thus, the panels 106 may include a positioning feature 702 and/or complementary positioning feature 704 to position the panels 106 of the adjacent columns 412 relative to each other.

As illustrated in FIG. 7, the tension cables 304 may pass through the positioning features 702 and complementary positioning features 704, such that as the tension is increased in the tension cables 304 by the spool 306, the tension cables 304 may draw the positioning features 702 and the complementary positioning features 704 together. The positioning features 702 and the complementary positioning features 704 may have geometries configured to restrict movement of the respective panels 106 when the positioning features 702 and the complementary positioning features 704 are engaged. For example, the positioning features 702 may include a recessed feature, such as an aperture, recess, indent, cup, and the complementary positioning features 704 may include a protrusion, such as a point, dome, pin, etc., that is complementary to the recessed feature of the positioning features 702.

In some embodiments, the positioning features 702 and the complementary positioning features 704 may include a self-centering geometry, such as a taper, configured to adjust a position of the complementary positioning feature 704 relative to the positioning feature 702 as the complementary positioning feature 704 is drawn into the positioning feature 702 by the tension cables 304. For example, the complementary positioning feature 704 may have a conical shape or pyramid shape and the positioning feature 702 may have a complementary reverse conical recess or reverse pyramid shape, such that as the complementary positioning feature 704 is drawn into the positioning feature 702 the conical features may serve to change a position of the complementary positioning feature 704 relative to the positioning feature 702 until the complementary positioning feature 704 and the positioning feature 702 are substantially concentrically arranged.

The positioning features 702 and complementary positioning features 704 may be configured to cause the panels 106 of each of the columns 412 to align and form rows 410. The rows 410 and columns 412 may combine to form the two dimensional panel array 200. The tension in the tension cables 304 may be substantially maintained by the spool 306 and tension elements 706 on an opposite end of the tension cables 304 from the spool 306. The tension elements 706 may be configured to compensate for differences in length between the tension cables 304 and/or expansion or contraction (e.g., thermal expansion) of the panels 106 or other components of the two dimensional panel array 200.

Figure 8:
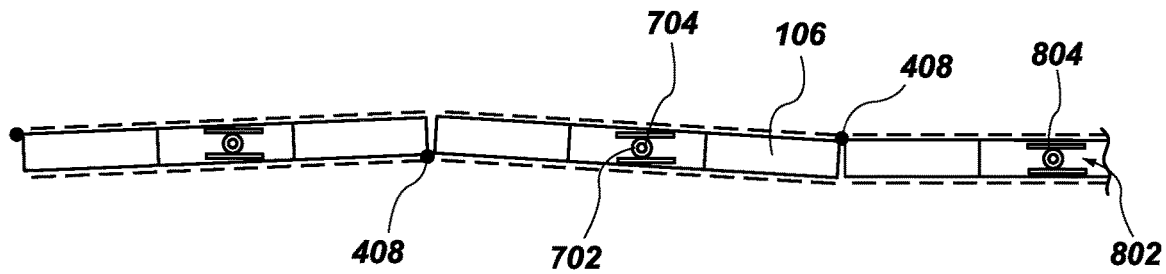
FIG. 8 illustrates a side view of the two dimensional panel of array of FIGS. 2 through 7.

FIG. 8 illustrates a side view of the multiple rows 410 of panels 106 at the junction point between two columns 412. The interface between the positioning features 702 and the complementary positioning features 704 may substantially prevent the individual panels 106 from moving in a radial direction relative to an axis of the positioning features 702 and complementary positioning features 704. For example, the positioning features 702 and the complementary positioning features 704 may substantially prevent the panels from rotating about at least two axes, such as an x-axis and a y-axis (e.g., the axes within the plane of the page). In some embodiments, the interface between the positioning features 702 and the complementary positioning features 704 may not be configured to restrict rotational movement of the individual panels 106 about the axis of the positioning features 702 and the complementary positioning features 704 (e.g., the z-axis or the axis coming out of the page). The positioning features 702 and the complementary positioning features 704 may engage with slots 802 defined by at least two parallel plates 804. The slots 802 may be configured to direct the positioning features 702 and the complementary positioning features 704 toward each other to account for slight dimensional differences between the panels 106 due to manufacturing tolerances and/or thermal expansion. The slight dimensional differences may result in some panel misalignment as the panels self-adjust by rotating about the axis of the positioning features 702 and the complementary positioning features 704. Large amounts of misalignment of the panels 106 may affect the performance of the associated two dimensional panel array 200.

Figure 9:
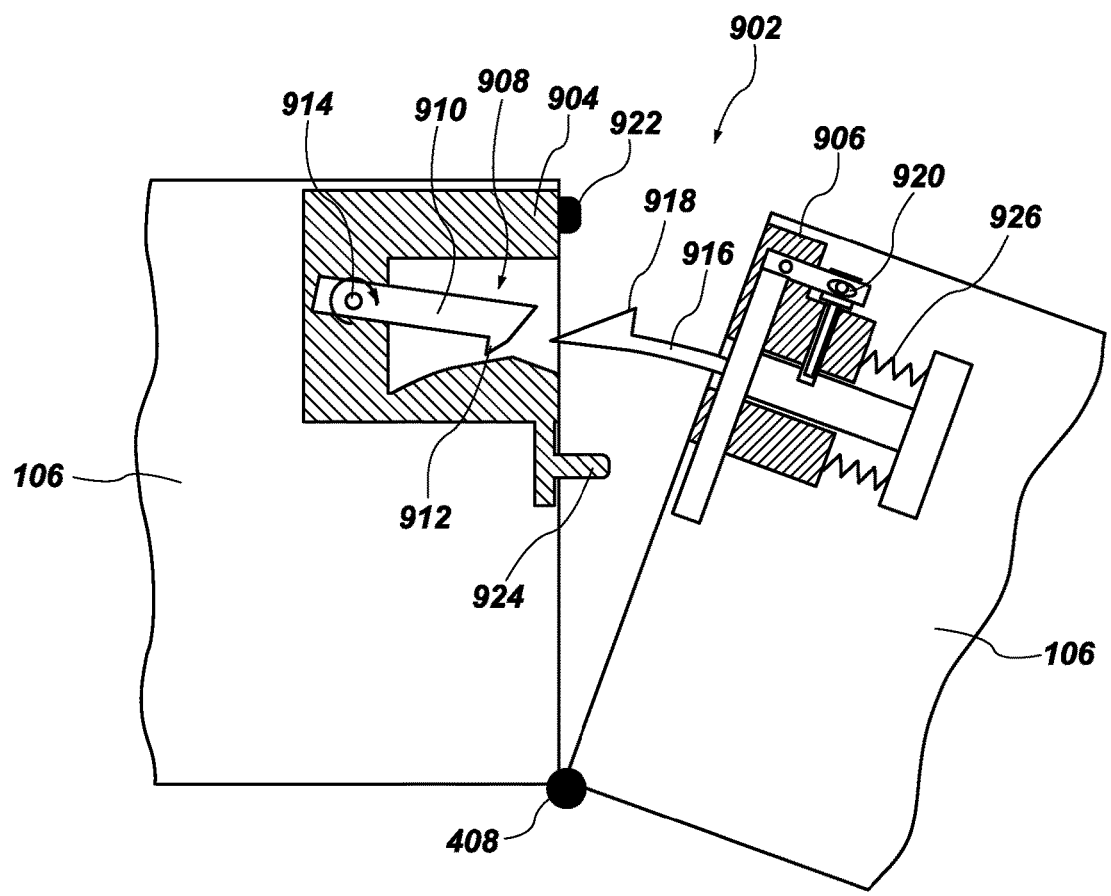
FIG. 9 illustrates a locking mechanism of the two dimensional panel array of FIGS. 2-8.

In some embodiments, a locking element 902 may be positioned on an opposite side of the joint between two panels 106 from the hinged connection 408. The locking element 902 may be configured to secure the opposite side of the joint, such that the adjacent panels 106 are secured in a substantially planar arrangement. As illustrated in FIG. 9, the locking element 902 may include a receiving element 904 disposed in a first panel 106 and a latching element 906 disposed in a second panel 106 adjacent to the first panel 106. The receiving element 904 and the latching element 906 may include complementary features configured to interface and latch the receiving element 904 and the latching element 906 together, securing the two adjacent panels 106 together at both the hinged connection 408 and the locking element 902.

The receiving element 904 may include a cavity 908 configured to receive a protruding portion of the latching element 906. The cavity 908 may include a latch 910. The latch 910 may include a catch 912 protruding from the latch 910. A leading portion of the latch 910 may include a tapered face. The tapered face may be tapered toward the catch 912 of the latch 910. The tapered face of the latch 910 may be configured to direct a complementary protrusion of the latching element 906 toward the side of the latch 910 with the catch 912.

The latch 910 may be coupled to the receiving element 904 through a biasing element 914 configured to bias the latch 910 in a direction toward the catch 912. The biasing element 914 may be a torsional spring, a cam, or a cantilever mounting structure. For example, as illustrated in FIG. 9, the latch 910 may be cantilevered into the receiving element 904 at an angle toward the catch 912. The latch 910 may be formed from a resilient material configured to elastically deform under a load and return to substantially the same resting position when the load is removed. Thus, as a complementary protrusion from the latching element 906 engages the tapered face of the latch 910, the latch 910 may bend away from the catch 912 loading the latch 910. When the load introduced by the protrusion of the latching element 906 is reduced, the latch 910 may unload by moving in a direction toward the catch 912 to the resting position. In some embodiments, the biasing element 914 may include a spring, such as a torsional spring configured to bias the latch 910 toward the catch 912. As the latch 910 is displaced, the spring may be loaded. When the displacing element is removed or adjusted, the spring may unload moving the latch 910 back toward the resting position.

The latching element 906 may include a hook 916 protruding from the latching element 906 toward the receiving element 904. The hook 916 may be the protruding element configured to be disposed into the cavity 908 of the receiving element 904 and interface with the latch 910 of the receiving element 904. The hook 916 may include a catch 918 extending from a surface of the hook 916. The catch 918 may protrude from the hook 916 in an opposite direction from the catch 912 of the latch 910, such that the catch 918 of the hook 916 and the catch 912 of the latch 910 are complementary. For example, the latch 910 and the hook 916 may be configured to interlock through the respective catches 912, 918. The leading face of the hook 916 may also include a tapered face that is complementary to the tapered face of the latch 910. The tapered face of the hook 916 may be angled toward the catch 918 of the hook 916. The complementary tapered faces of the hook 916 and the latch 910 may be configured to allow the hook 916 to pass under the catch 912 of the latch 910 until the catch 918 of the hook 916 and the catch 912 of the latch 910 pass one another and interlock. When the catches 912, 918 interlock the interface between the catches 912, 918 may substantially prevent the separation of the latching element 906 and the receiving element 904.

In some embodiments, the locking element 902 may include a stop 922 positioned between the receiving element 904 and the latching element 906. The stop 922 may be configured to apply a tension between the receiving element 904 and the latching element 906. For example, the stop 922 may be formed from a resilient material configured to bias the receiving element 904 and the latching element 906 away from one another. The stop 922 may be sized such that the catches 912, 918 of the latch 910 and the hook 916 may interlock before the biasing load of the stop 922 prevents movement of the latching element 906 relative to the receiving element 904. The biasing load of the stop 922 may bias the latching element 906 away from the receiving element 904, such that the interlocked catches 912, 918 may secure the two adjacent panels 106.

In some embodiments, the latching element 906 may include a release 920. The release 920 may be configured to manually disengage the hook 916 from the latch 910. Once the panel array is deployed in space there may be no need to disengage the hook 916 from the latch 910. However, during testing the manual disengagement of the hook 916 and the latch 910 may be desired to enable the two dimensional panel array 200 to be returned to a stacked relationship.

In some embodiments, the release 920 may be disengaged when the adjacent panels 106 reach a substantially open position where the hook 916 is engaged by the latch 910. A pin 924 extending from the receiving element 904 may press into the release 920 causing the release 920 to disengage. When the release 920 is disengaged, a tension element 926, such as a spring, may allow the hook 916 to move relative to the latching element 906. The tension element 926 may apply a tension force away from the receiving element 904, which may pull the two panels 106 together while enabling the locking element 902 to compensate for manufacturing tolerances, temperature expansion, etc.

FIGS. 10A through 10F illustrate other embodiments of a deployment sequence of a deployment system for the two dimensional panel array 200 configured to deploy using the tension cables 304. As described above, the two dimensional panel array 200 may be stored in a stacked configuration with major faces 402 of adjacent panels 106 facing each other and the edge faces 404 facing outward. The stack may be separated into segments 308, which may correspond with columns of the resulting two dimensional panel array 200. The segments 308 may be joined together at hinged connections 406, which may alternate side to side on the stack.

As described above, the tension cables 304 may pass between adjacent segments 308 on the side of the segments 308 including the hinged connections 406. The tension cables 304 may pass from a bottom panel 1002 of a first segment 308 to a top panel 1008 of a second segment 308 and from a top panel 1006 of the first segment 308 to a bottom panel 1004 of the second segment 308 following a similar pattern for the intermediate panels 106 as well, which may enable the tension cables 304 to each have substantially the same length of loose cable to be drawn in when deploying the two dimensional panel array 200.

Figure 10A:
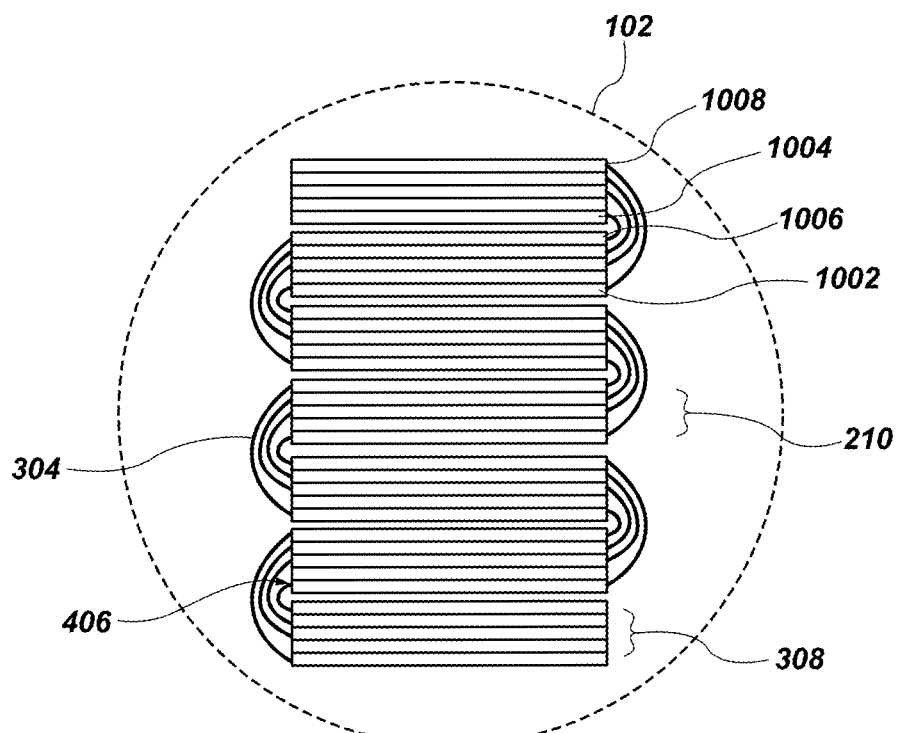
FIGS. 10A through 10F illustrate a deployment sequence of a two dimensional panel array in accordance with one or more embodiments of the present disclosure.
Figure 10B:
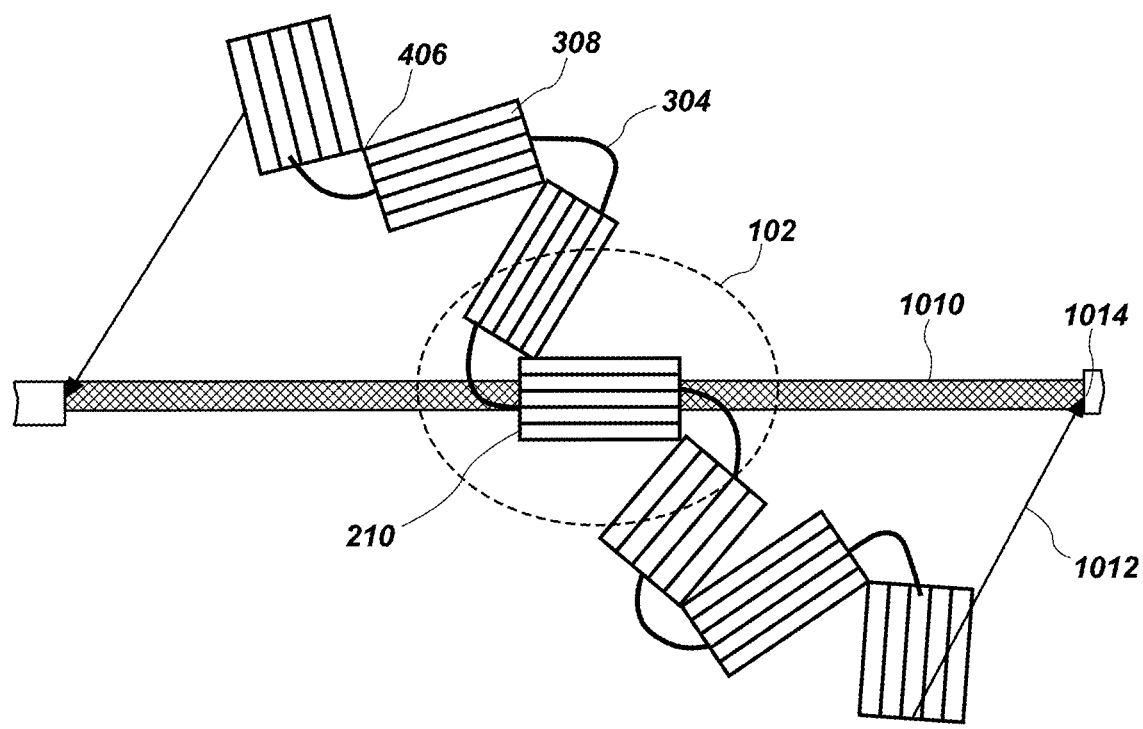

FIG. 10B illustrates the initial deployment of the segments 308. One or more spools 306 (FIG. 10F) may begin to wind in the tension cables 304. As the tension cables 304 are wound in by the one or more spools 306, the tension created in the tension cables 304 may cause the segments 308 to rotate about the respective hinged connections 406.

Figure 10C:
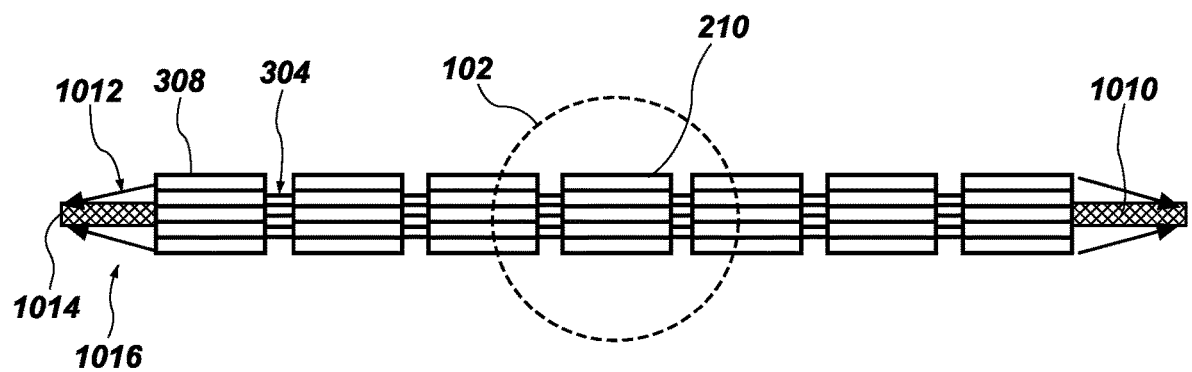

A boom 1010 may extend from the body 102 to guide and/or support the extension of the segments 308. The boom 1010 may extend in substantially the same longitudinal plane as the segment 308 corresponding to the primary column 210. As the segments 308 extend, the segments 308 may form a row of segments 1016 substantially parallel with the boom 1010 as illustrated in FIG. 10C. In some embodiments, the tension in the tension cables 304 may pull the segments 308 into the row of segments 1016, similar to the embodiment described above in FIGS. 6A-6F, such that the boom 1010 provides a supporting structure. In other embodiments, a tether 1012 may attach (e.g., tie) the outer segments 308 to a distal end 1014 of the boom 1010. For example, the tether 1012 may be a separate cable configured to pull the outer segments 308 to the distal end 1014 of the boom 1010 to ensure alignment of the row of segments 1016 and the boom 1010. In some embodiments, the tether 1012 may be configured to reduce the strain in the tension cables 304.

Figure 10D:
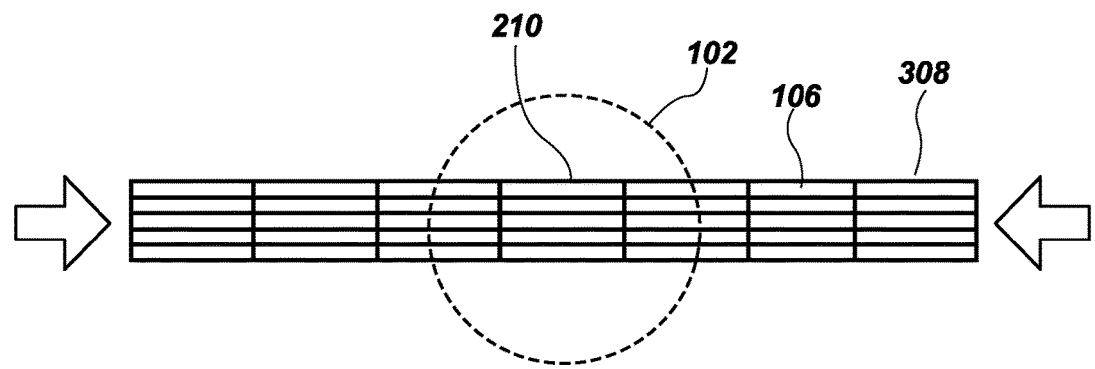
Figure 10E:
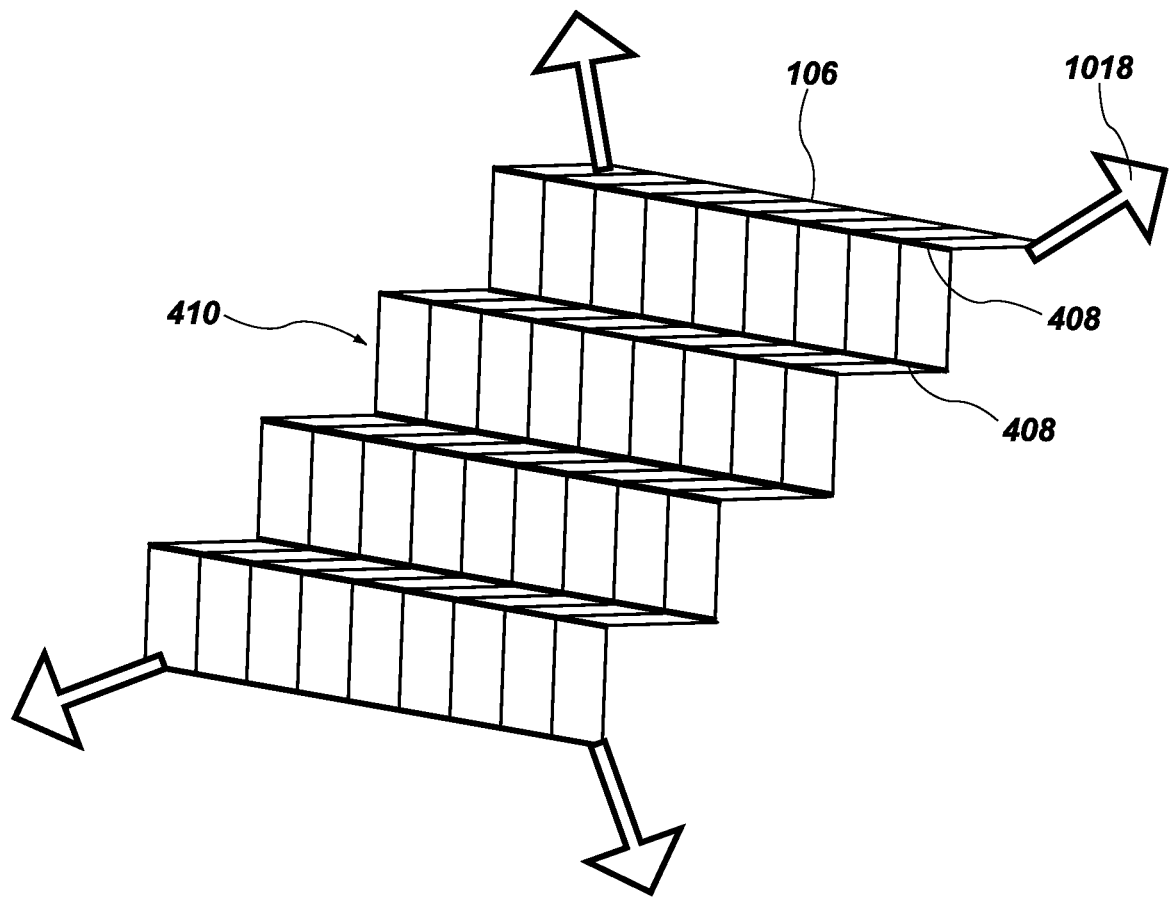

Once the segments 308 form a row of segments 1016 the tension in the tension cables 304 may pull the segments 308 together as illustrated in FIG. 10D by arrows. Pulling the segments 308 together may engage the positioning features 702 and the complementary positioning features 704.

The spools 306 may continue to wind the tension cables 304 generating an outward force as described above. In addition to the outward force generated by the tension cables 304, the corner booms 1020 may generate a diagonal outward force illustrated by arrows 1018 in FIGS. 10E and 10F. The outward force may cause the two dimensional panel array 200 to expand in a columnar direction as indicated by the arrows 1018. As the two dimensional panel array 200 expands, the rows 410 may rotate relative to one another about the hinged connections 408 between the panels 106 of the respective rows 410.

Figure 10F:
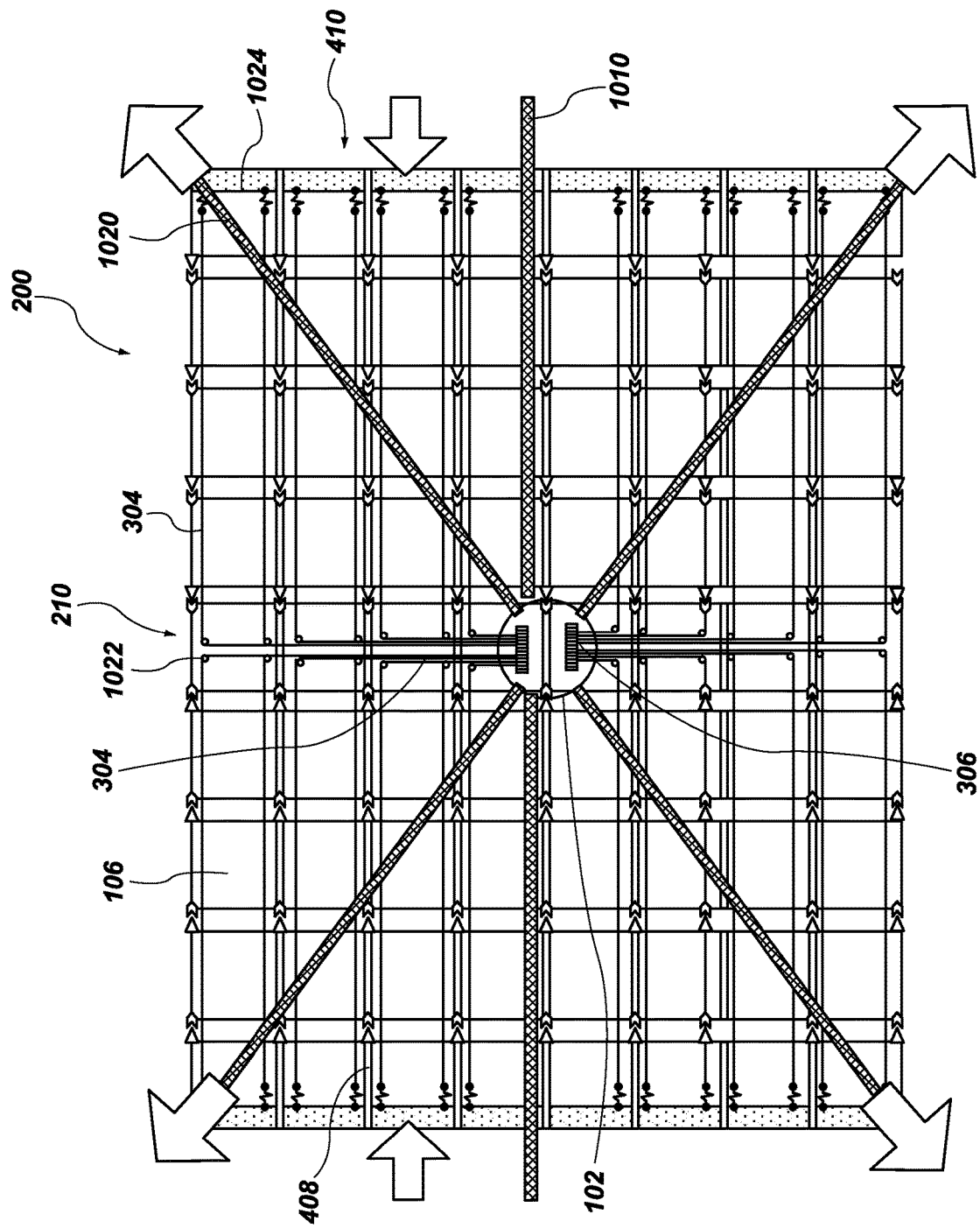

As illustrated in FIG. 10F, the tension cables 304 may extend along the primary column 210 to the respective rows 410 of panels 106 where the tension cables 304 may extend around a pulley 1022 into the respective rows 410. Thus, as the tension is increased in the tension cables 304, the primary column 210 may be driven outward. Driving the primary column 210 outward may result in the rows 410 being driven out as a result of the tension in the tension cables 304 substantially locking the rows 410 to the respective panels 106 in the primary column 210.

As illustrated in FIG. 10F, the number of tension cables 304 in the primary column 210 may be reduced at each row 410 as the tension cables 304 extend farther away from the body 102. As described above, the tension in the tension cables 304 along the rows 410 may be created when the segments 308 are extended out to form the row of segments 1016. After the tension in the rows 410 is created the additional tension introduced into the tension cables 304 may act on the pulleys 1022 to cause the primary column 210 to extend out until all of the slack in the tension cables 304 is drawn in by winding the tension cables 304 onto the spools 306.

In some embodiments, corner booms 1020 may extend out from the body 102 at an angle relative to the boom 1010. The corner booms 1020 may be coupled to corner panels 1024 of the two dimensional panel array 200, such as through a tether, similar to the tether 1012 described above. The extension of the corner booms 1020 may apply tension to the two dimensional panel array 200 to assist in the expansion of the rows 410 in the columnar direction. In some embodiments, the corner booms 1020 may extend after the two dimensional panel array 200 is fully expanded, such that the corner booms 1020 may support the assembly without assisting to expand the two dimensional panel array 200.

Figure 11:
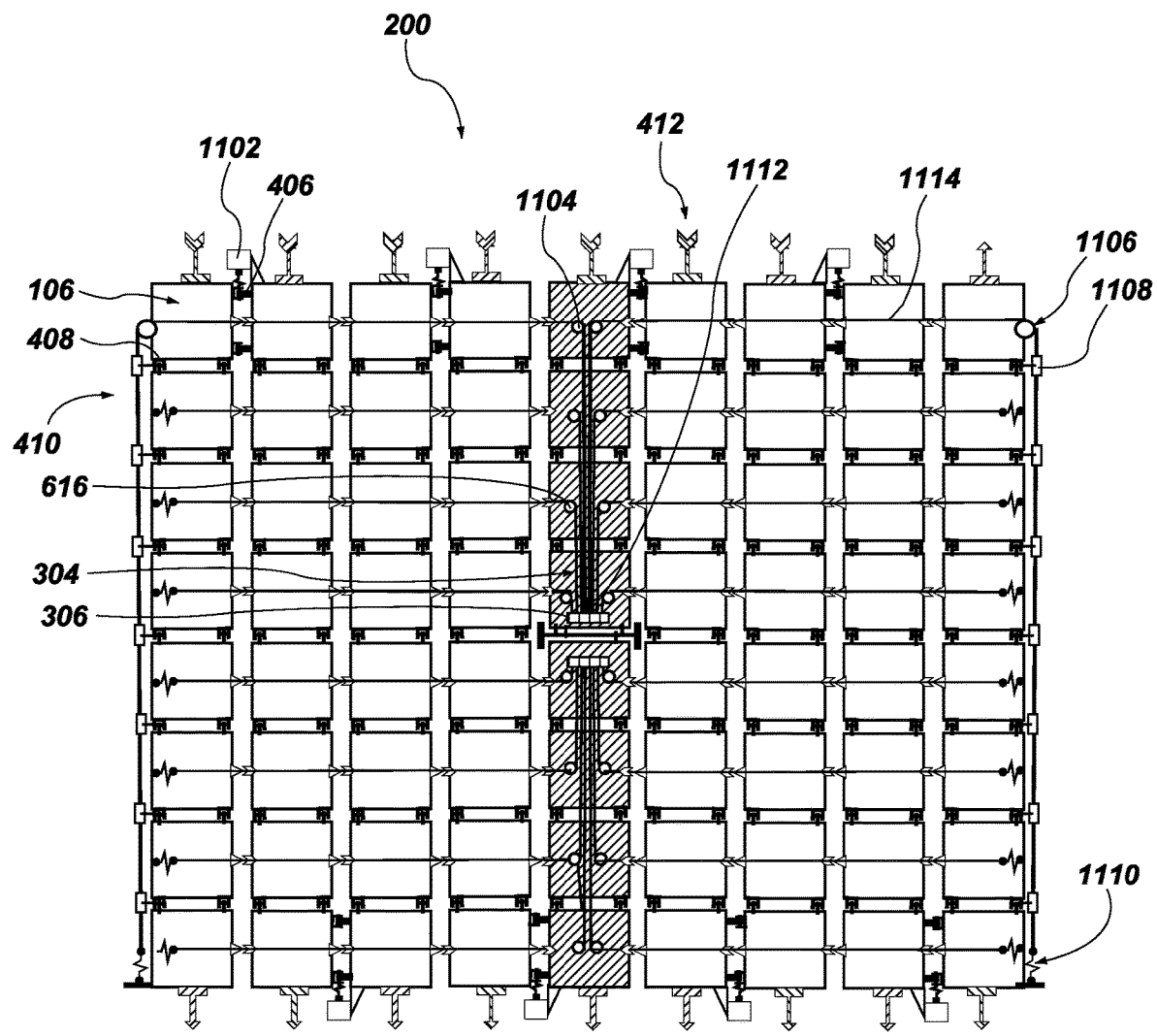
FIGS. 11 through 13 illustrate schematic views of different two dimensional panel arrays and deployment systems in accordance with one or more embodiments of the present disclosure.
Figure 12:
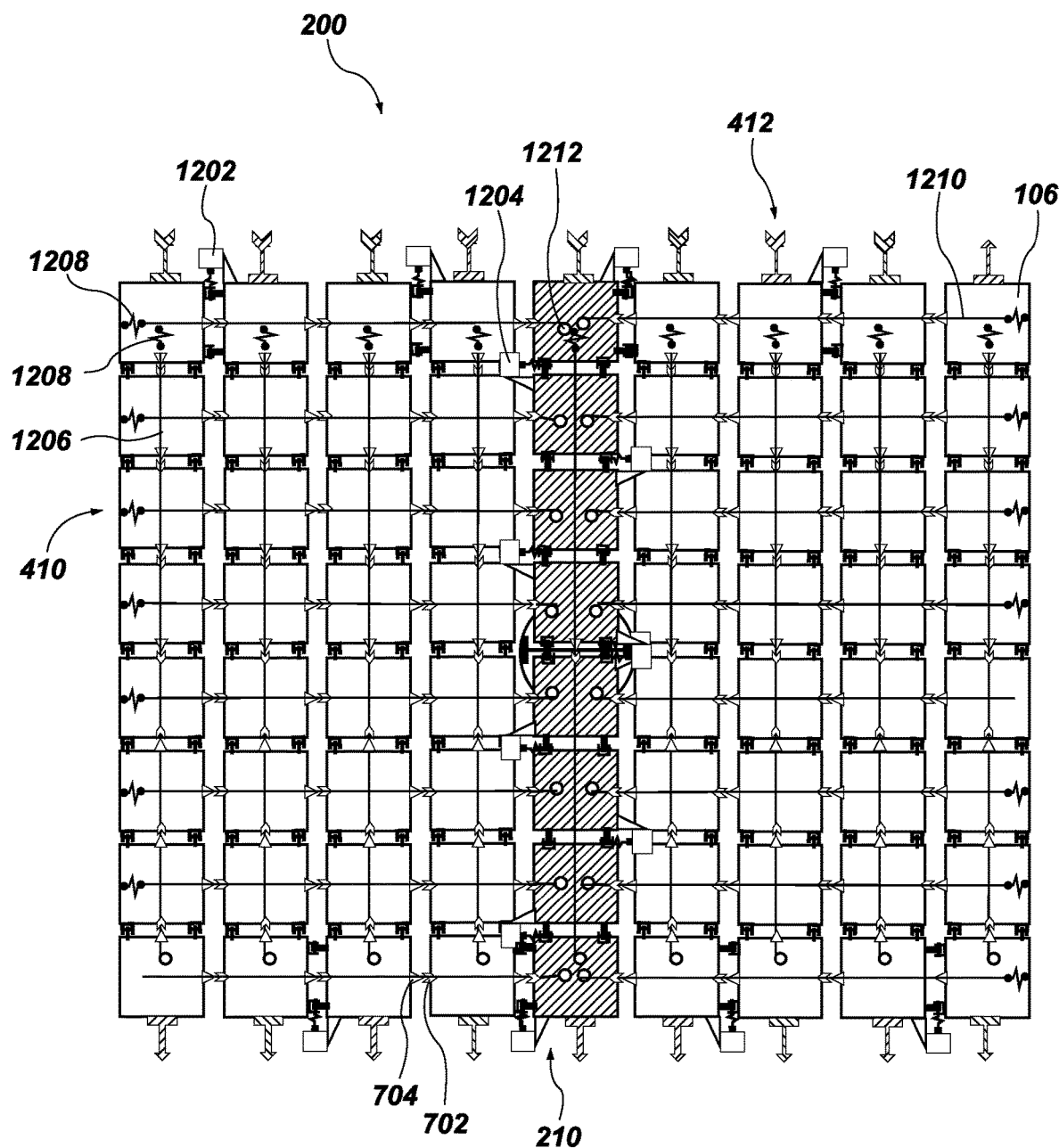
Figure 13:
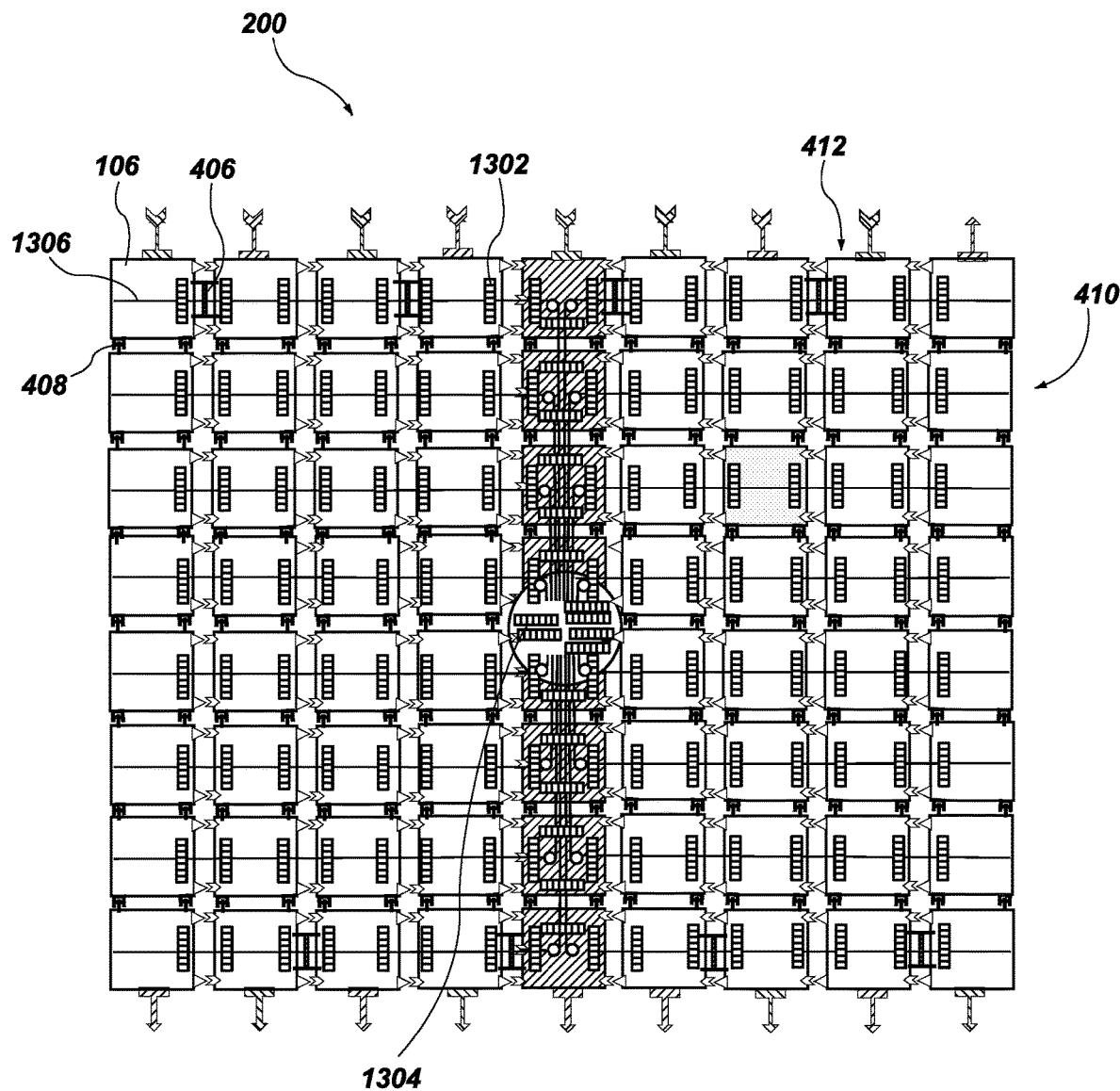

FIG. 11 through FIG. 13 illustrate alternative deployment systems for the two dimensional panel array 200. FIG. 11 illustrates a two dimensional panel array 200 including the tension cables 304 and spool 306 for applying tension to the tension cables 304 when deploying the two dimensional panel array 200. In addition to the tension cables 304 and the spool 306, the deployment system may include electric motors 1102 positioned adjacent to the hinged connections 406 between the columns 412 (i.e., the hinged connections 406 between the segments 308 as described above). The electric motors 1102, such as stepper motors, may be configured to control an angular position of the respective hinged connections 406. The electric motors 1102 may be configured to assist the tension cables 304 in the deployment of the segments 308, such as in the step illustrated in FIG. 6B.

The deployment system illustrated in FIG. 11 may further include perimeter cables 1114 configured to stabilize the perimeter panels 106 and to assist in driving out the columns 412 after the row of segments 308 is fully extended. The perimeter cables 1114 may be coupled to a perimeter spool 1112, which may be separately controlled (e.g., run by a separate motor) from the spool 306 associated with the tension cables 304. The perimeter cables 1114 may replace the tension cables 304 in at least one of the outermost rows 410 of panels 106. The perimeter cables 1114 may extend past the end of the associated row 410 of panels 106 to an outer pulley 1106. The outer pulley 1106 may direct the perimeter cable 1114 down an outer edge of the two dimensional panel array 200 where the perimeter cable 1114 may be coupled to the hinged connections 408 between the panels 106 at perimeter panel connections 1108. When the columns 412 are deployed, the perimeter cable 1114 may be configured to apply a tension force to extend the columns 412 at both the primary column 210, similar to the other embodiments described above, and along the perimeter columns.

The perimeter cable 1114 may be coupled to a perimeter tension element 1110 opposite the outer pulley 1106 on the same outer edge of the two dimensional panel array 200. The perimeter tension element 1110 may be configured to adjust a length of the perimeter cable 1114 to maintain a tension on the perimeter cable 1114 when the length of the outer edge of the two dimensional panel array 200 or the perimeter cable 1114 increases or decreases, such as due to thermal expansion. For example, the perimeter tension element 1110 may be a spring similar to the tension elements 706 described above.

FIG. 12 illustrates a two dimensional panel array 200 including electric motors (e.g., column motors 1202, row motors 1204) to deploy the two dimensional panel array 200. The electric motors may be positioned adjacent to the hinged connections 406, 408 between the columns 412 and rows 410. The electric motors may be configured to control an angular position of the respective hinged connections 406, 408, such as stepper motors. The electric motors may be controlled separately. For example, the column motors 1202 may operate first expanding the segments 308 by rotating the respective segments 308 about the hinged connections 406, as described above, with respect to FIG. 11. After the column motors 1202 expand the segments 308 to form a row of segments, such as the rows of segments 612, 1016 described above, the row motors 1204 may cause the respective rows 410 to rotate about the hinged connections 408 to expand in a columnar direction.

As illustrated in FIG. 12, the row motors 1204 may be positioned along a single column 412, such as the primary column 210. The other panels 106 in each row 410 may be coupled together through the positioning features 702 and complementary positioning features 704 as described above with respect to FIG. 7. The positioning features 702 and complementary positioning features 704 may be engaged by tension cables, such as row tension cables 1210 and column tension cables 1206. As illustrated in FIG. 12, the row tension cables 1210 and the column tension cables 1206 may be separate from one another and may extend across the respective rows 410 and columns 412 between an anchor 1212 and a tension element 1208. The tension element 1208 may be a spring element similar to the tension elements 706 described above. The tension element 1208 may be configured to allow the row tension cables 1210 and the column tension cables 1206 to extend as necessary to allow the rows 410 and columns 412 to collapse into the stack of panels 106, while maintaining sufficient tension in the row tension cables 1210 and the column tension cables 1206 to fully engage the positioning features 702 and complementary positioning features 704. As illustrated in FIG. 12, the row tension cables 1210 may only extend across half of each row 410, while the column tension cables 1206 may extend the full length of each column 412. This may enable the tension elements 1208 associated with the row tension cables 1210 to allow greater amounts of extension in the respective row tension cables 1210 per panel 106. The greater amounts of extension may enable the respective segments 308 to be collapsed into a stack. Because the segments 308 each represent a stack of panels 106, the amount of extension in the row tension cables 1210 may be larger than the amount of extension in the column tension cables 1206.

In some embodiments, the deployment system illustrated in FIG. 12 may enable the deployment of the two dimensional panel array 200 to be reversible. For example, the two dimensional panel array 200 may be folded back into a stack of panels 106 within the body 102. The electric motors 1202, 1204 may operate in reverse order and direction. The row motors 1204 may first rotate the respective rows 410 to collapse the rows 410 back into a row of segments 308. The column motors 1202 may then fold the segments 308 back onto one another to form the stacked configuration. Such an operation may enable the two dimensional panel array 200 to be included and operated on a vehicle configured to exit and reenter the earth's atmosphere, such as a human transport vehicle.

FIG. 13 illustrates a two dimensional panel array 200 including the tension cables 1306 and multiple spools 1304 for applying tension to the tension cables 1306 when deploying the two dimensional panel array 200. In some embodiments, the system may include a separate spool 1304 for each row 410. In other embodiments, the system may include a separate spool 1304 for each tension cable 1306. The separate spools 1304 may enable tighter control of the tension in the tension cables 1306. For example, the separate spools 1304 may enable the elimination of the tension elements (e.g., tension elements 706, 1208 described above).

Another result of the separate spools 1304 may be the generation of greater force in the tension cables 1306. The greater force in the tension cables 1306 may enable the two dimensional panel array 200 to expand in a shorter amount of time. The greater force may also introduce additional stress between the panels 106, such as at the connection points between the tension cables 1306 and the panels 106 and at the hinged connections 406, 408. The stresses in the connection points between the tension cables 1306 and the panels 106 may be reduced by using a pulley stack 1302 to connect the tension cables 1306 to the respective panels 106. The pulley stacks 1302 may also be used to connect the tension cables to the panels 106 in the embodiments illustrated above in FIGS. 1 through 12. The pulley stacks 1302 are described in further detail below with respect to FIG. 14 through FIG. 18.

Figure 14:
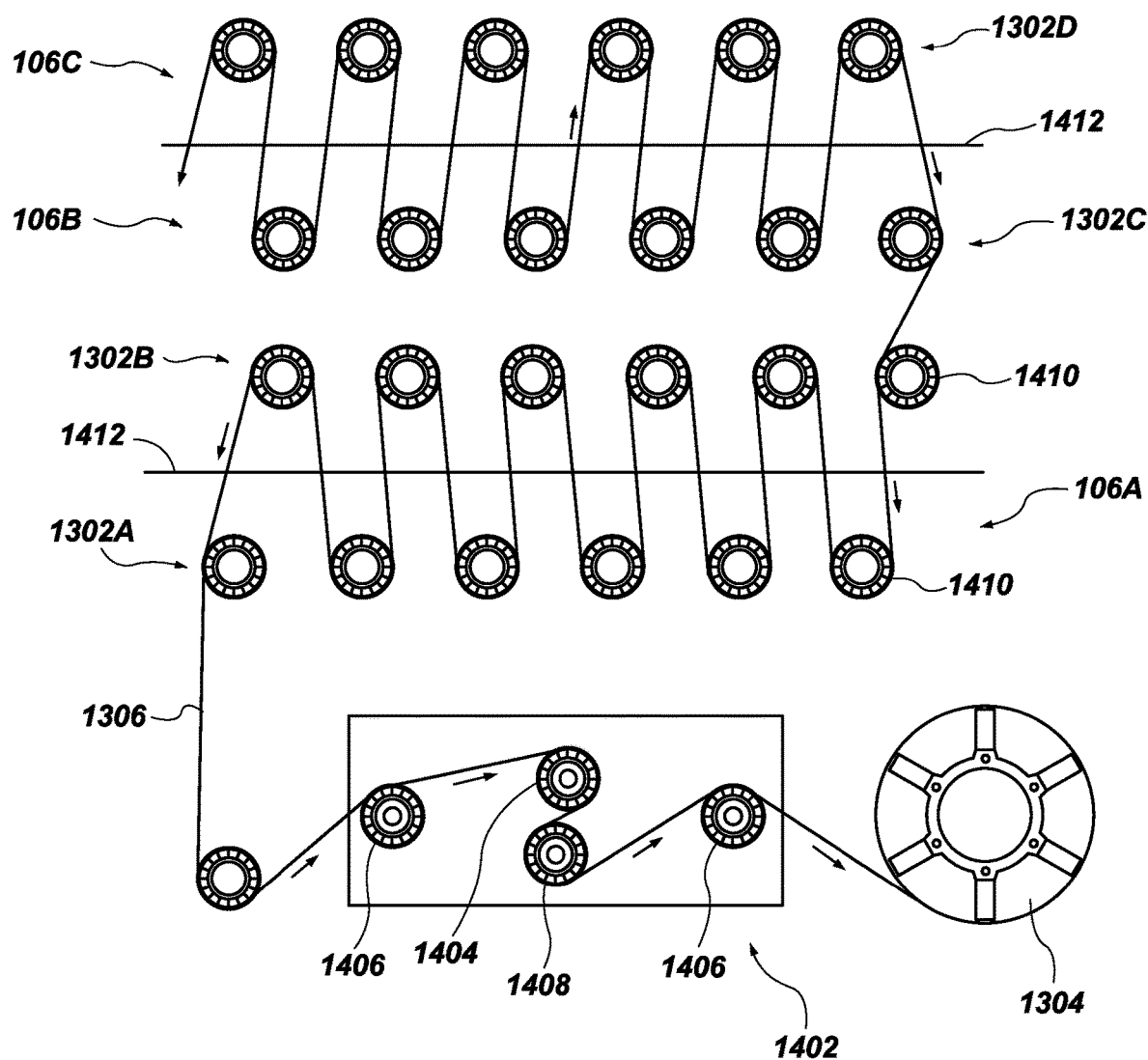
FIGS. 14 through 15B illustrate schematic views of a panel joint between two panels in accordance with one or more embodiments of the present disclosure.

FIG. 14 illustrates a schematic view of multiple panel joints 1412 between panels 106 that each include pulley stacks 1302. As illustrated in FIG. 14, the tension cable 1306 may pass back and forth from the pulleys 1410 of a first pulley stack 1302A on a first panel 106A to the pulleys 1410 of a second pulley stack 1302B on a second adjoining panel 106B. The tension cable 1306 passing back and forth between the adjoining pulley stacks 1302 may act as a force multiplier effectively multiplying the force generated by the tension in the tension cable 1306. The force multiplying effect may enable a single tension cable 1306 to generate the force of multiple tension cables 1306. The force multiplying effect may create a greater amount of force to be used when deploying the two dimensional panel array 200, which may enable the two dimensional panel array 200 to be deployed more rapidly.

After passing around each pulley 1410 in each of the pulley stacks 1302 the tension cable 1306 may pass to a third pulley stack 1302C on the second panel 106B where the tension cable 1306 may pass between the pulleys 1410 in the third pulley stack 1302C and a pulley stack 1302D in an adjoining third panel 106C in a similar manner to that described above between the first panel 106A and the second panel 106B. In some embodiments, the third pulley stack 1302C may be angularly offset from the second pulley stack 1302B, such as by about 90°, with a pulley (e.g., pulleys 616, 1022, and 1104) configured to change a direction of the tension cable 1306 between the two pulley stacks 1302 in the second panel 106B.

As described above, the tension in the tension cable 1306 may be substantially controlled by a spool 1304. The spool 1304 may control the tension in the tension cable 1306 by rotating and winding the tension cable 1306 around the spool 1304 until the desired amount of tension is achieved. The spool 1304 may reduce the tension in the tension cable 1306 by unwinding a portion of the tension cable 1306 until the desired amount of tension is achieved.

The tension cable 1306 may pass through a tension sensor 1402 before the spool 1304. The tension sensor 1402 may include two guide pulleys 1406 on opposite ends of the tension sensor 1402 and a sensor pulley 1404 and fixed pulley 1408 between the two guide pulleys 1406. The sensor pulley 1404 may be configured to change position relative to the fixed pulley 1408 based on the amount of tension in the tension cable 1306. For example, the sensor pulley 1404 may move away from the spool 1304 as the tension in the tension cable 1306 increases and the sensor pulley 1404 may move toward the spool 1304 as the tension in the tension cable 1306 decreases. The sensor pulley 1404 may be coupled to a sensor, such as a strain sensor, position sensor, etc., that may be configured to determine a tension in the tension cable 1306 based on a position of the sensor pulley 1404.

Figure 15A:
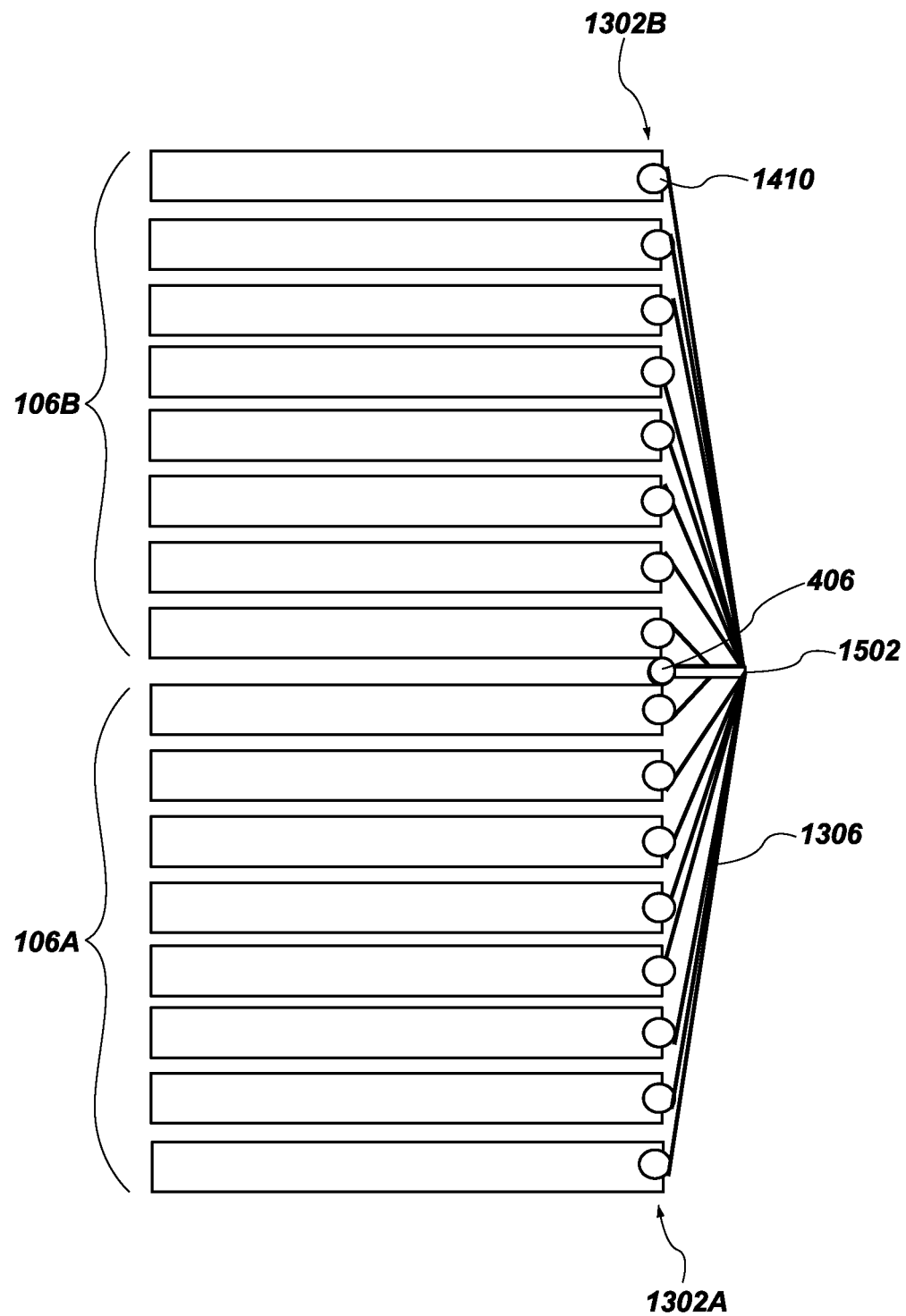
Figure 15B:
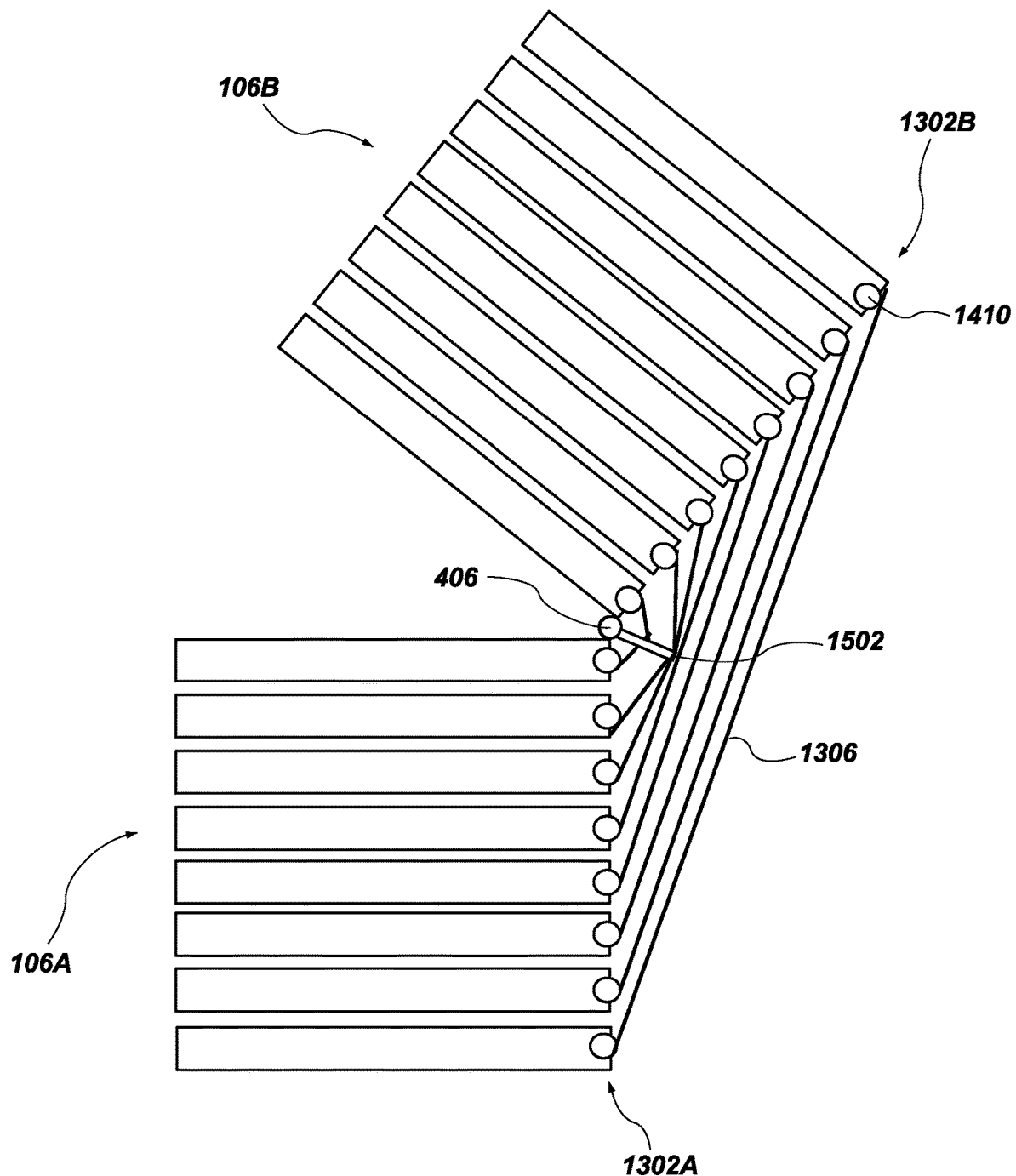

FIGS. 15A and 15B illustrate a schematic view of a joint between two panels 106 including pulley stacks 1302 in a stacked arrangement and partially deployed. The pulley stacks 1302 may be arranged such that the distances between the individual pulleys 1410 in the two pulley stacks 1302 increase as the distance of the pulleys 1410 from the hinged connection 406 increases. As described above, the tension cable 1306 may pass back and forth between the individual pulleys 1410 of the first pulley stack 1302A and the second pulley stack 1302B. The tension cable 1306 may pass between the innermost pulleys 1410 (e.g., the pulleys 1410 nearest the hinged connection 406 between the first panel 106A and the second panel 106B) and then successively through each set of pulleys 1410 until the outermost pulleys 1410.

The hinged connection 406 may include a spacer 1502. The spacer 1502 may extend from the hinged connection 406 in a direction away from the stack of panels 106. The tension cable 1306 may pass over and/or through the spacer 1502 as the tension cable 1306 passes between the pulleys 1410 of the first pulley stack 1302A and the second pulley stack 1302B. The spacer 1502 may position the tension cable 1306 a distance from the pulley stacks 1302, such that as the tension in the tension cable 1306 is increased the tension cable 1306 may apply an angular force to the individual pulleys 1410 and cause the first panel 106A and the second panel 106B to rotate about the hinged connection 406 changing the angular position of the first panel 106A relative to the second panel 106B as illustrated in FIG. 15B. The spacer 1502 may be configured to increase the leverage arm of the tension cable 1306, which may reduce the tension required in the tension cable 1306 to begin the deployment sequence.

As the angular position between the first panel 106A and the second panel 106B changes, the tension cable 1306 may begin to be removed from the spacer 1502. For example, the tension cable 1306 passing between the outermost pulleys 1410 may be the first portion of the tension cable 1306 to be removed from the spacer 1502. As the angle between the first panel 106A and the second panel 106B about the hinged connection 406 increases, the tension cable 1306 running between each of the pulleys 1410 may successively be removed from the spacer 1502 until the first pulley stack 1302A and the second pulley stack 1302B are aligned as illustrated in FIG. 14. In some embodiments, the tension cable 1306 passing between the innermost pulleys 1410 may pass through a different portion of the spacer 1502, such that the tension cable 1306 passing between the innermost pulleys 1410 may not be removed from the spacer 1502. While FIGS. 15A and 15B illustrate two segments 308 joined by the hinged connection 406, a similar arrangement may be used to the junction between two panels 106 by the hinged connection 408.

Figure 16A:
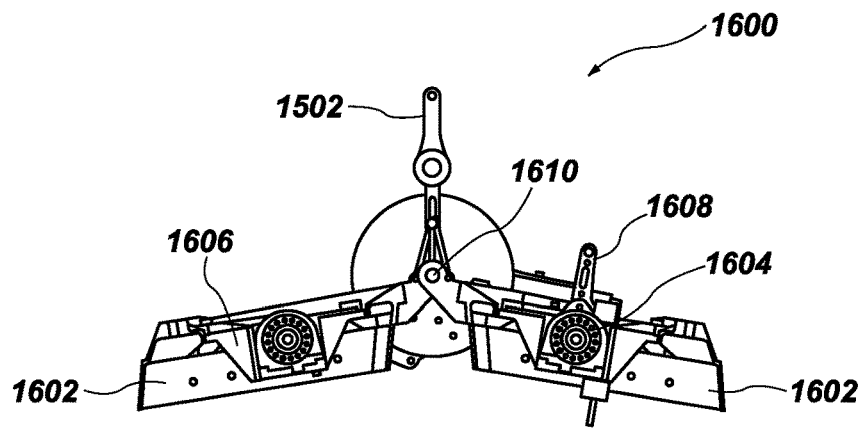
FIG. 16A through 16C illustrate schematic views of a hinged connection in different orientations in accordance with one or more embodiments of the present disclosure.
Figure 16B:
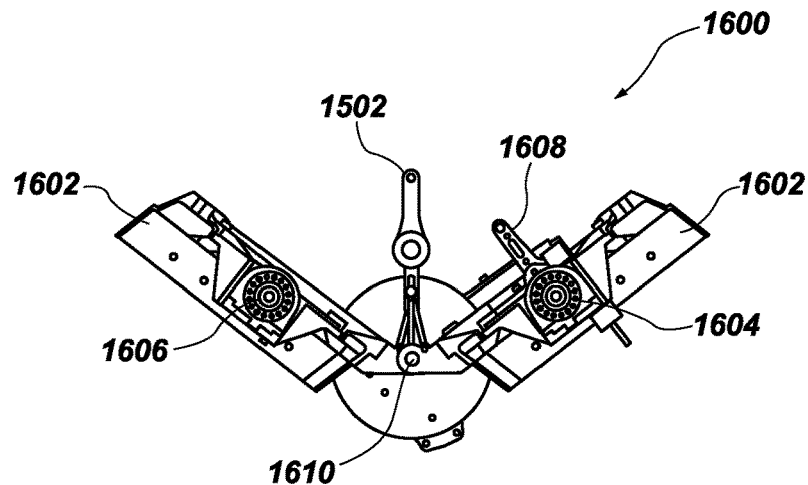
Figure 16C:
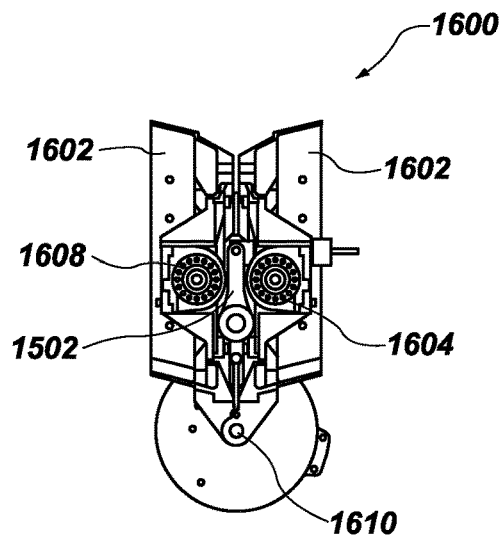

FIGS. 16A through 16C illustrate a hinged connection 1600 in several different orientations. The hinged connection 1600 may be used between panels 106 as the hinged connections 408 described above or between segments 308 as the hinged connections 406 described above. The hinged connection 1600 may include at least two panel connections 1602 coupled through a hinge 1610. The panel connections 1602 may be configured to couple to the hinged connection 1600 to adjoining panels 106. The hinged connection 1600 may include a latching element 1604 and a complementary receiving element 1606. The latching element 1604 may include a latch protrusion 1608 configured to interface with the receiving element 1606 to lock the hinged connection 1600 in the closed position illustrated in FIG. 16C. For example, the latching element 1604 and the receiving element 1606 may be configured similar to the latching element 906 and the receiving element 904 of the locking element 902 described above.

The hinged connection 1600 may include a spacer 1502 configured to control positioning of tension cables, such as tension cables 304, 1306 relative to the hinge 1610 and the adjoining panels 106. As described above, the spacer 1502 may provide spacing between the hinge 1610 and the tension cables in an opened position as illustrated in FIG. 16A. The interaction between the spacer 1502 and the tension cables may reduce as the hinged connection 1600 approaches the closed position illustrated in FIG. 16C. The spacer 1502 may be configured to be sandwiched between the two panel connections 1602 in the closed position.

Figure 17:
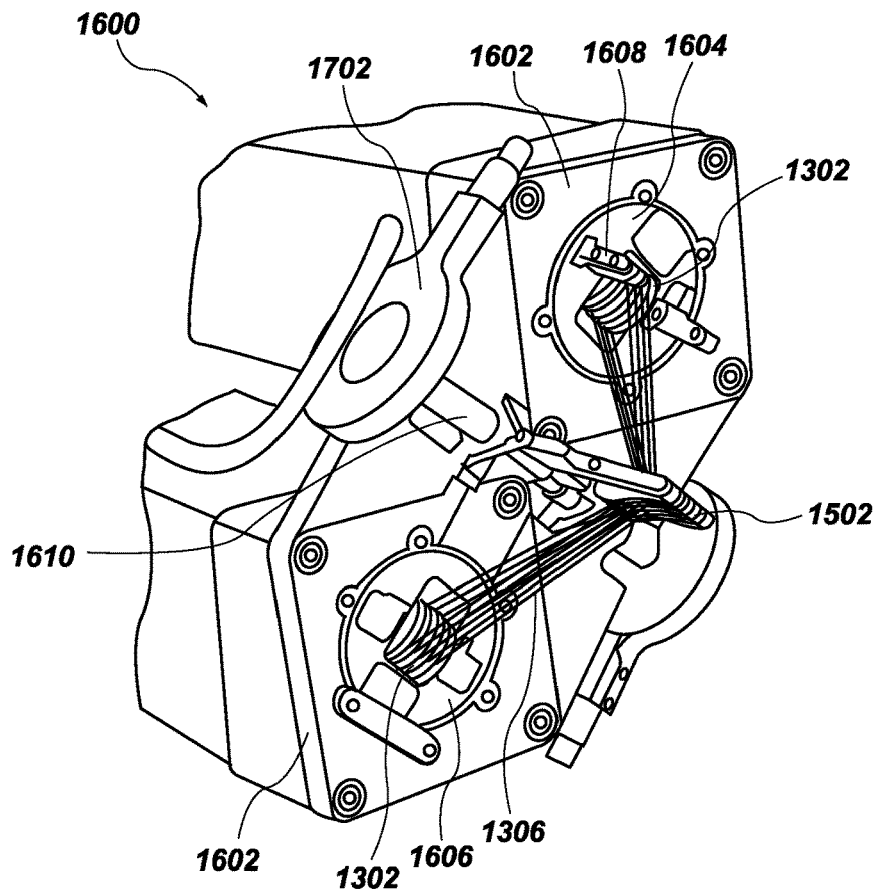
FIG. 17 and FIG. 18 illustrate a hinged connection in accordance with one or more embodiments of the present disclosure.
Figure 18:
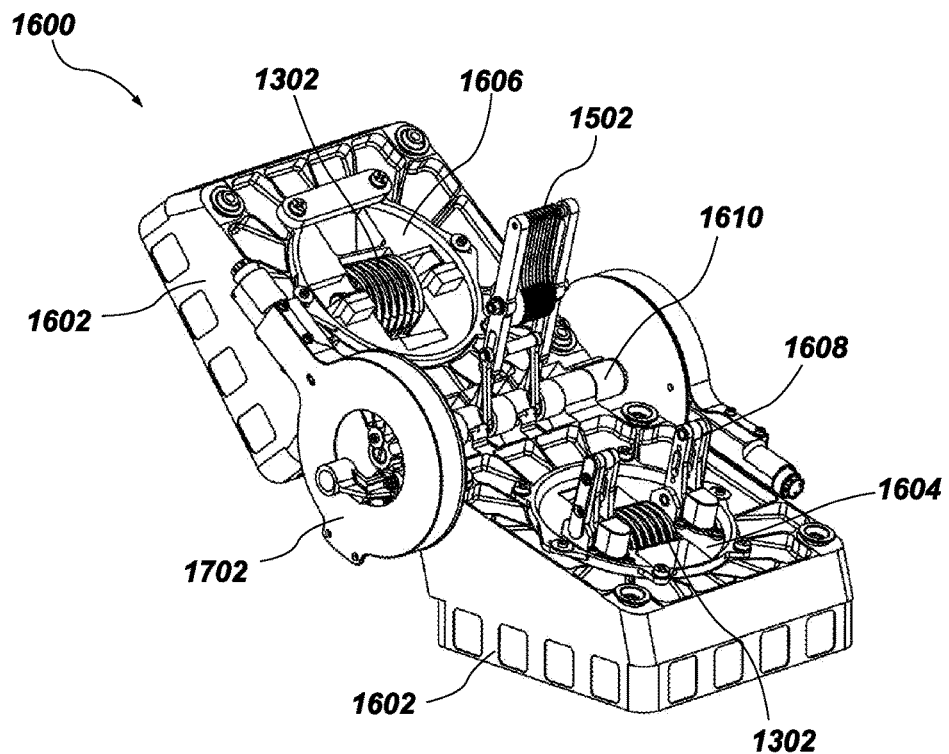

FIG. 17 and FIG. 18 illustrate embodiments of the hinged connection 1600. As illustrated in FIG. 17 and FIG. 18, the hinged connection 1600 may include the pulley stacks 1302. For example, the pulley stacks 1302 may be included in the latching element 1604 and/or the receiving element 1606. The pulley stacks 1302 may be arranged such that a distance between each of the pulleys 1410 of the pulley stacks 1302 is substantially the same (e.g., such that each of the pulleys 1410 are positioned substantially the same distance from the hinge 1610).

As illustrated in FIG. 17, the tension cables 1306 may pass through the spacer 1502. Because the pulleys 1410 are each positioned at substantially the same distance from the hinge 1610, the tension cables 1306 between each of the pulleys 1410 may be removed from contact with the spacer 1502 at substantially the same time. In some embodiments, the tension cables 1306 between each of the pulleys 1410 may not be removed from contact with the spacer 1502, similar to the tension cables 1306 passing between the innermost pulleys 1410 described above in FIGS. 15A and 15B.

The hinged connection 1600 may include a ratcheting element 1702. For example, the ratcheting element 1702 may be configured to allow the hinged connection 1600 to rotate in a first direction about the hinge 1610 while restricting movement of the hinged connection 1600 in a second opposite direction. In some embodiments, the ratcheting element 1702 may be configured to be releasable. For example, the ratcheting element 1702 may include a manual release that may enable testing structures to be deployed and retracted. In some embodiments, the ratcheting element 1702 may include an electronic release, which may enable the hinged connection 1600 to operate in a reverse direction, such as for the reversible two dimensional panel arrays 200 described above.

The embodiments of the present disclosure may enable the size requirements for transporting the panel array (e.g., the solar array, RF panel array) to be reduced. Equipment used in space and transmitted to space may have strict size requirements due to weight restrictions and the expense of transporting equipment to space. Reducing the size requirements of the panel array may enable larger panel arrays to be installed on the equipment, which may increase the power available to the equipment. In some embodiments, reducing the size requirements of the panel array may enable additional components or equipment to be transported. In other embodiments, reducing the size requirements of the panel array may enable the transportation vehicles to be reduced in size, which may reduce the amount of fuel required and the expense of transporting the equipment.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A panel array comprising:
   a plurality of panels arranged in one or more columns and one or more rows;

a first cable extending along a column of the one or more columns to a first row of the one or more rows, the first cable extending around a first pulley and along the first row and coupled to each of the plurality of panels in the first row;

a second cable extending along the column of the one or more columns past the first row to a second row of the one or more rows, the second cable extending around a second pulley and along the second row and coupled to each of the plurality of panels in the second row; and interlocking features on adjacent panels of the plurality of panels in the first row;

wherein the first cable is configured to apply tension between the plurality of panels in the first row and cause the interlocking features to engage.

2. The panel array of claim 1, wherein the interlocking features comprise a recessed feature and a complementary protruding feature.

3. The panel array of claim 2, wherein the recessed feature comprises a tapered recess.

4. The panel array of claim 2, wherein the complementary protruding feature comprises a tapered protrusion.

5. The panel array of claim 4, wherein the tapered protrusion comprises a cone.

6. The panel array of claim 4, wherein the tapered protrusion comprises a pyramid.

7. The panel array of claim 1, wherein the interlocking features are configured to substantially prevent the adjacent panels of the plurality of panels from moving in a radial direction relative to an axis of the interlocking features.

8. The panel array of claim 1, wherein the interlocking features comprise a receiving element and a latching element.

9. The panel array of claim 8, wherein the receiving element comprises a cavity configured to receive a hook of the latching element.

10. The panel array of claim 8, wherein the receiving element comprises a latch disposed within the receiving element configured to interlock with a hook of the latching element.

11. A panel array deployment system including:
a main body;
a first cable extending along a first row of panels and coupled to each panel of the first row of panels;
a second cable extending along a second row of panels and coupled to each panel of the second row of panels;
a first column of panels extending from the main body, the first column of panels comprising a panel from the first row of panels and a panel from the second row of panels, each of the first cable and the second cable extending to the main body through the first column of panels; and
a spool positioned in the main body adjacent the first column of panels, the spool coupled to the first cable and the second cable, the spool configured to apply tension to the first cable and the second cable.

12. The panel array deployment system of claim 11, wherein the first cable is coupled to an end panel of the first row of panels through a tension element.

13. The panel array deployment system of claim 12, wherein the tension element comprises a spring.

14. The panel array deployment system of claim 11, wherein the first cable extends from the spool around a pulley coupled to the panel from the first row of panels in the first column and along the first row of panels to an end panel in the first row of panels.

15. The panel array deployment system of claim 14, wherein the second cable extends from the spool around a second pulley coupled to the panel from the second row of panels in the first column and along the second row of panels to an end panel in the second row of panels.

16. The panel array deployment system of claim 11, wherein the panel from the first row of panels in the first column is coupled to the panel from the second row of panels in the first column through a hinged connection.

17. The panel array deployment system of claim 11, wherein each panel in the first row of panels is configured to be secured to an adjacent panel in the first row of panels through tension in the first cable and complementary interlocking features.

18. A method of deploying a panel array comprising:
providing a panel array comprising multiple panels coupled to one another through hinged connections, the hinged connections configured to create multiple rows and columns of panels in an expanded configuration;
applying tension to a first cable and a second cable through a spool positioned in a main body;
extending a row of panel sets, each panel set comprising a plurality of the multiple panels;
extending the panel sets, to form a column of the multiple panels from each extended panel set through the tension in the first cable;
engaging first interlocking features between adjacent panels of a first row of panels in the row of panel sets through the tension in the first cable; and
engaging second interlocking features between adjacent panels of a second row of panels in the row of panel sets through the tension in the second cable.

19. The method of claim 18, further comprising extending the panel sets into the columns of panels after engaging the first interlocking features between the adjacent panels of the first row of panels and engaging the second interlocking features between the adjacent panels of the second row of panels.

20. The method of claim 18, wherein extending the row of panels sets comprises rotating each panel set relative to an adjacent panel set about a hinged connection between the adjacent panel sets.

* * * * *